(12) United States Patent
Bodin et al.

(10) Patent No.: US 8,112,499 B2
(45) Date of Patent: Feb. 7, 2012

(54) ADMINISTERING DEVICES IN DEPENDENCE UPON USER METRIC VECTORS

(75) Inventors: William Kress Bodin, Austin, TX (US); Michael John Burkhart, Round Rock, TX (US); Daniel Gene Eisenhauer, Austin, TX (US); Daniel Mark Schumacher, Pflugerville, TX (US); Thomas James Watson, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1012 days.

(21) Appl. No.: 11/767,981

(22) Filed: Jun. 25, 2007

(65) Prior Publication Data

US 2007/0287893 A1    Dec. 13, 2007

Related U.S. Application Data

(63) Continuation of application No. 10/418,689, filed on Apr. 17, 2003.

(51) Int. Cl.
*G06F 15/16* (2006.01)

(52) U.S. Cl. ....................................... 709/218
(58) Field of Classification Search .................... 709/218
See application file for complete search history.

(56) References Cited

U.S. PATENT DOCUMENTS

| | | | |
|---|---|---|---|
| 4,461,301 A | 7/1984 | Ochs | |
| 5,181,200 A | 1/1993 | Harrison | |
| 5,212,806 A | 5/1993 | Natarajan | |
| 5,265,010 A | 11/1993 | Evans-Paganelli et al. | |
| 5,454,046 A | 9/1995 | Carman, II | |
| 5,491,837 A | 2/1996 | Haartsen | |
| 5,518,001 A | 5/1996 | Snell | |
| 5,544,651 A | 8/1996 | Wilk | |
| 5,564,070 A | 10/1996 | Want et al. | |
| 5,571,195 A | 11/1996 | Johnson | |
| 5,572,438 A | 11/1996 | Ehlers et al. | |
| 5,725,148 A | 3/1998 | Hartman | |
| 5,774,591 A | 6/1998 | Black | |
| 5,802,146 A | 9/1998 | Dulman | |
| 5,807,114 A | 9/1998 | Hodges et al. | |
| 5,825,759 A | 10/1998 | Liu | |
| 5,825,769 A | 10/1998 | O'Reilly et al. | |
| 5,996,010 A | 11/1999 | Leong et al. | |
| 6,078,815 A | 6/2000 | Edwards | |
| 6,108,654 A | 8/2000 | Chan et al. | |
| 6,167,445 A | 12/2000 | Gai et al. | |
| 6,256,737 B1 | 7/2001 | Bianco et al. | |
| 6,345,264 B1 | 2/2002 | Breese et al. | |
| 6,381,556 B1 | 4/2002 | Kazemi et al. | |

(Continued)

OTHER PUBLICATIONS

RD 453129; Remote Controlling System for Home Electronic Equipment Via Email; Jan. 2002; p. 108.

(Continued)

*Primary Examiner* — John Follansbee
*Assistant Examiner* — Maceeh Anwari
(74) *Attorney, Agent, or Firm* — DeLizio Giliam, PLLC

(57) ABSTRACT

Methods, systems, and products are disclosed for administering devices that include creating a user metric vector including a plurality of disparate user metrics, creating a user metric space including a plurality of metric ranges, determining whether the user metric vector is outside the user metric space, identifying an action in dependence upon the user metric vector if the user metric vector is outside a user metric space, and executing the action.

24 Claims, 12 Drawing Sheets

U.S. PATENT DOCUMENTS

| | | | |
|---|---|---|---|
| 6,418,424 | B1 | 7/2002 | Hoffberg et al. |
| 6,519,235 | B1 | 2/2003 | Kim et al. |
| 6,572,542 | B1 | 6/2003 | Houben et al. |
| 6,577,637 | B1 | 6/2003 | Sieppi |
| 6,579,231 | B1 | 6/2003 | Phipps |
| 6,591,095 | B1 | 7/2003 | Palaniswamy et al. |
| 6,643,707 | B1 | 11/2003 | Booth |
| 6,645,153 | B2 | 11/2003 | Kroll et al. |
| 6,656,125 | B2 | 12/2003 | Misczynski et al. |
| 6,679,830 | B2 | 1/2004 | Kolarovic et al. |
| 6,697,947 | B1 | 2/2004 | Matyas et al. |
| 6,725,276 | B1 | 4/2004 | Hardjono et al. |
| 6,732,168 | B1 | 5/2004 | Bearden et al. |
| 6,848,000 | B1 | 1/2005 | Reynolds |
| 6,971,063 | B1 | 11/2005 | Rappaport et al. |
| 6,993,378 | B2 | 1/2006 | Wiederhold et al. |
| 7,016,325 | B2 | 3/2006 | Beasley et al. |
| 7,031,279 | B2 | 4/2006 | Lee et al. |
| 7,035,443 | B2 | 4/2006 | Wong |
| 7,082,116 | B2 | 7/2006 | Reza et al. |
| 7,085,260 | B2 | 8/2006 | Karaul et al. |
| 7,151,969 | B2 | 12/2006 | Bodin et al. |
| 7,164,883 | B2 | 1/2007 | Rappaport et al. |
| 7,246,243 | B2 | 7/2007 | Uchida |
| 7,254,619 | B2 | 8/2007 | Mekata et al. |
| 7,261,690 | B2 | 8/2007 | Teller et al. |
| 7,395,282 | B1 | 7/2008 | Crescenti et al. |
| 7,779,114 | B2 | 8/2010 | Bodin et al. |
| 2002/0013856 | A1 | 1/2002 | Garcia-Luna-Aceves et al. |
| 2002/0043568 | A1 | 4/2002 | Hess et al. |
| 2002/0095586 | A1 | 7/2002 | Doyle et al. |
| 2002/0105355 | A1 | 8/2002 | Floyd et al. |
| 2002/0135618 | A1 | 9/2002 | Maes et al. |
| 2002/0174346 | A1* | 11/2002 | Ting .............................. 713/186 |
| 2002/0184373 | A1 | 12/2002 | Maes |
| 2003/0046072 | A1 | 3/2003 | Ramaswamy et al. |
| 2003/0095476 | A1 | 5/2003 | Mollicone et al. |
| 2003/0123714 | A1 | 7/2003 | O'Gorman et al. |
| 2003/0137947 | A1 | 7/2003 | Roy et al. |
| 2003/0149344 | A1 | 8/2003 | Nizan |
| 2003/0204599 | A1 | 10/2003 | Trossen et al. |
| 2003/0216625 | A1 | 11/2003 | Phipps |
| 2004/0030531 | A1 | 2/2004 | Miller et al. |
| 2004/0049391 | A1 | 3/2004 | Polanyi et al. |
| 2004/0143428 | A1 | 7/2004 | Rappaport et al. |
| 2004/0176991 | A1 | 9/2004 | McKennan et al. |
| 2004/0236547 | A1 | 11/2004 | Rappaport et al. |
| 2009/0019457 | A1 | 1/2009 | Bodin et al. |

OTHER PUBLICATIONS

"U.S. Appl. No. 10/418,596 Final Office Action", May 3, 2007, 11 pages.
"U.S. Appl. No. 10/418,596 Final Office Action", Mar. 5, 2008, 13 pages.
"U.S. Appl. No. 10/418,596 Notice of Allowance", Apr. 6, 2010, 5 pages.
"U.S. Appl. No. 10/418,596 Office Action", Dec. 15, 2006, 10 pages.
"U.S. Appl. No. 10/418,596 Office Action", Aug. 4, 2009, 11 pages.
"U.S. Appl. No. 10/418,596 Office Action", Sep. 10, 2007, 11 pages.
"U.S. Appl. No. 10/418,596 Office Action", Feb. 4, 2009, 9 pages.
"U.S. Appl. No. 10/418,612 Final Office Action", Aug. 20, 2008, 10 pages.
"U.S. Appl. No. 10/418,612 Final Office Action", Nov. 19, 2007, 7 pages.
"U.S. Appl. No. 10/418,612 Office Action", Dec. 6, 2006, 6 pages.
"U.S. Appl. No. 10/418,612 Office Action", Apr. 30, 2007, 6 pages.
"U.S. Appl. No. 10/418,612 Office Action", Mar. 5, 2008, 7 pages.
"U.S. Appl. 10/418,612 Office Action", Jan. 22, 2009, 8 pages.
"U.S. Appl. No. 10/418,689 Final Office Action", Apr. 1, 2010, 12 pages.
"U.S. Appl. No. 10/418,689 Final Office Action", May 3, 2007, 12 pages.
"U.S. Appl. No. 10/418,689 Final Office Action", Mar. 5, 2008, 14 pages.
"U.S. Appl. No. 10/418,689 Office Action", Dec. 15, 2006, 10 pages.
"U.S. Appl. No. 10/418,689 Office Action", Aug. 28, 2009, 11 pages.
"U.S. Appl. No. 10/418,689 Office Action", May 3, 2007, 12 pages.
"U.S. Appl. No. 10/418,689 Office Action", Nov. 10, 2010, 14 pages.
"U.S. Appl. No. 10/418,689 Office Action", Jul. 6, 2011, 20 pages.
"U.S. Appl. No. 10/418,689 Office Action", Feb. 19, 2009, 9 pages.
"U.S. Appl. No. 10/439,036 Final Office Action", Jul. 7, 2005, 9 pages.
"U.S. Appl. No. 10/439,036 Notice of Allowance", Nov. 9, 2006, 6 pages.
"U.S. Appl. No. 10/439,036 Office Action", May 30, 2006, 8 pages.
"U.S. Appl. No. 10/439,036 Office Action", Jan. 26, 2005, 9 pages.
"U.S. Appl. No. 10/612,702 Final Office Action", May 15, 2007, 9 pages.
"U.S. Appl. No. 10/612,702 Notice of Allowance", Jun. 9, 2008, 11 pages.
"U.S. Appl. No. 10/612,702 Office Action", Sep. 6, 2007, 10 pages.
"U.S. Appl. No. 10/612,702 Office Action", Dec. 29, 2006, 8 pages.
"U.S. Appl. No. 10/651,724 Final Office Action", Aug. 28, 2008, 12 pages.
"U.S. Appl. No. 10/651,724 Final Office Action", Nov. 15, 2007, 8 pages.
"U.S. Appl. No. 10/651,724 Office Action", Jul. 19, 2007, 7 pages.
"U.S. Appl. No. 10/651,724 Office Action", Apr. 9, 2008, 8 pages.
"U.S. Appl. No. 11/769,190 Office Action", Mar. 17, 2011, 14 pages.
"U.S. Appl. No. 11/769,205 Non Final Office Action", Jun. 23, 2010, 22 pages.
Fink, Donald G. et al., *Electronics Engineers' Handbook* First Edition; McGraw-Hill Book Company 1975, 17-22 through 17-27.
Kim, Yong-Dae et al., "Fabrication of a Silicon Micro-Probe for Vertical Probe Card Application", *Japanese Journal of Applied Physics* vol. 37 1998, pp. 7070-7073.
Yuille, A. et al., "Feature Extraction from Faces Using Deformable Templates", *International Journal of Computer Vision* vol. 8, Issue 2. Aug. 1992, pp. 99-111.
Office Action, U.S. Appl. No. 10/455,174, Mar. 22, 2007.
Final Office Action, U.S. Appl. No. 10/455,174, Oct. 31, 2007.
Final Office Action, U.S. Appl. No. 11/769,190, Jun. 26, 2008.
Office Action, U.S. Appl. No. 11/769,190, Oct. 28, 2009.
Final Office Action, U.S. Appl. No. 11/769,190, Mar. 25, 2010.
Office Action, U.S. Appl. No. 11/769,190, Oct. 6, 2010.
Office Action, U.S. Appl. No. 11,767,981, Jul. 2, 2010.
Final Office Action, U.S. Appl. No. 11/767,981, Jan. 10, 2011.
Office Action, U.S. Appl. No. 11/839,808, Jun. 12, 2008.
Final Office Action, U.S. Appl. No. 11/839,808, Dec. 1, 2008.
Office Action, U.S. Appl. No. 12/185,876, Jun. 24, 2010.
Final Office Action, U.S. Appl. No. 12/185,876, Dec. 7, 2010.

* cited by examiner

| DML – 202 |
|---|
| MetricService – 552 |
| MetricRangeService – 558 |
| CommService – 554 |
| ActionService – 560 |
| DeviceService – 556 |
| VectorService – 559 |
| MetricSpaceService – 561 |
| Start() – 557 |

| MetricService – 204 |
|---|
| createMetrics() – 562 |

| MetricRangeService – 208 |
|---|
| createRange() – 572 |

| ActionService – 217 |
|---|
| createActionList() – 564 |

| DeviceService – 218 |
|---|
| createDeviceList() – 570 |

| CommService – 219 |
|---|
| createCommsObject() – 574 |

| MetricVectorService – 207 |
|---|
| createVectorObject() – 565 |

| Metric – 206 |
|---|
| UserID – 486 |
| MetricID – 488 |
| Value – 490 |

| Metric Range – 210 |
|---|
| RangeID – 463 |
| UserID – 464 |
| MetricID - 462 |
| Max – 468 |
| Min – 470 |
| getMin() - 471 |
| getMax() - 473 |

| MetricSpaceService – 209 |
|---|
| createMetricSpace() – 567 |

| Metric Vector - 606 |
|---|
| UserID – 486 |
| Metric List – 652 |
| ActionList- 492 |
| start() - 495 |

| Action – 216 |
|---|
| Action ID – 450 |
| deviceList – 458 |
| do_action() – 456 |

| Device – 214 |
|---|
| DeviceID – 472 |
| commObj – 478 |
| address – 480 |
| get() – 474 |
| set() – 476 |

| Comms – 215 |
|---|
| send() – 482 |
| receive() – 484 |

| Metric Space – 610 |
|---|
| SpaceID – 908 |
| UserID – 405 |
| RangeList – 655 |

Figure 11

ADMINISTERING DEVICES IN DEPENDENCE UPON USER METRIC VECTORS

CROSS-REFERENCE TO RELATED APPLICATION

This application is a continuation application of and claims priority from U.S. patent application Ser. No. 10/418,689, filed on Apr. 17, 2003.

BACKGROUND OF THE INVENTION

1. Field of the Invention

The field of the invention is data processing, or, more specifically, methods, systems, and products for administering devices.

2. Description of Related Art

Conventional networks contain various devices. A user often uses the various devices, or adjusts the particular settings of the devices in dependence upon the user's current condition. That is, a user's current condition often motivates the user to change the settings of devices so that the devices operate in a manner that more positively benefits the user's current condition. For example, a user with a headache may be disturbed by a powerful light. The user may dim the light, or turn the light off, so that the light no longer disturbs the user. Conventional networked devices, however, require user intervention to individually administer the specific device in response to user condition. It would be advantageous if there were a method of administering devices in dependence upon user condition that did not require user intervention.

SUMMARY OF THE INVENTION

Exemplary embodiments of the invention include methods for administering devices. Exemplary embodiments include creating a user metric vector comprising a plurality of disparate user metrics, creating a user metric space comprising a plurality of metric ranges, and determining whether the user metric vector is outside the user metric space. Such embodiments include identifying an action in dependence upon the user metric vector, if the user metric vector is outside a user metric space, and executing the action.

In exemplary embodiments of the invention, creating a user metric vector includes receiving a plurality of disparate user metrics having a plurality of metric values and a plurality of disparate metric IDs, and associating the plurality of disparate user metrics with the user metric vector. In such embodiments, creating a user metric space includes identifying a plurality of metric ranges for a plurality of disparate metrics, and associating the plurality of disparate metric ranges with the user metric space. In typical embodiments, creating a user metric space includes editing a metric range. In such embodiments, editing a metric range includes receiving an editing instruction from a user.

In exemplary embodiments of the invention, determining whether the user metric vector is outside a user metric space includes comparing the metric values of the user metric vector with the metric ranges of the metric space. In such embodiments, comparing the metric values of the user metric vector with the metric ranges of the metric space includes measuring a degree to which a value of the user metric is outside a metric range. In typical embodiments, comparing the metric values of the user metric vector with the metric ranges of the metric space includes identifying whether a value of the user metric is above a metric range or below a metric range.

In exemplary embodiments of the invention, determining whether the user metric vector is outside a user metric space includes calculating a metric vector value. In such embodiments, determining whether the user metric vector is outside a user metric space includes calculating a metric space value and comparing the metric vector value and the metric space value. In typical embodiments, identifying an action in dependence upon the user metric vector includes retrieving an action ID from an action list. In exemplary embodiments, executing an action includes identifying a device class representing the device. In such embodiments, executing an action includes identifying a communication class for the device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 11 is a class diagram illustrating exemplary data structures useful in implementing methods for administering devices in accordance with the present invention.

DETAILED DESCRIPTION OF EXEMPLARY EMBODIMENTS

Introduction

Figure 1:
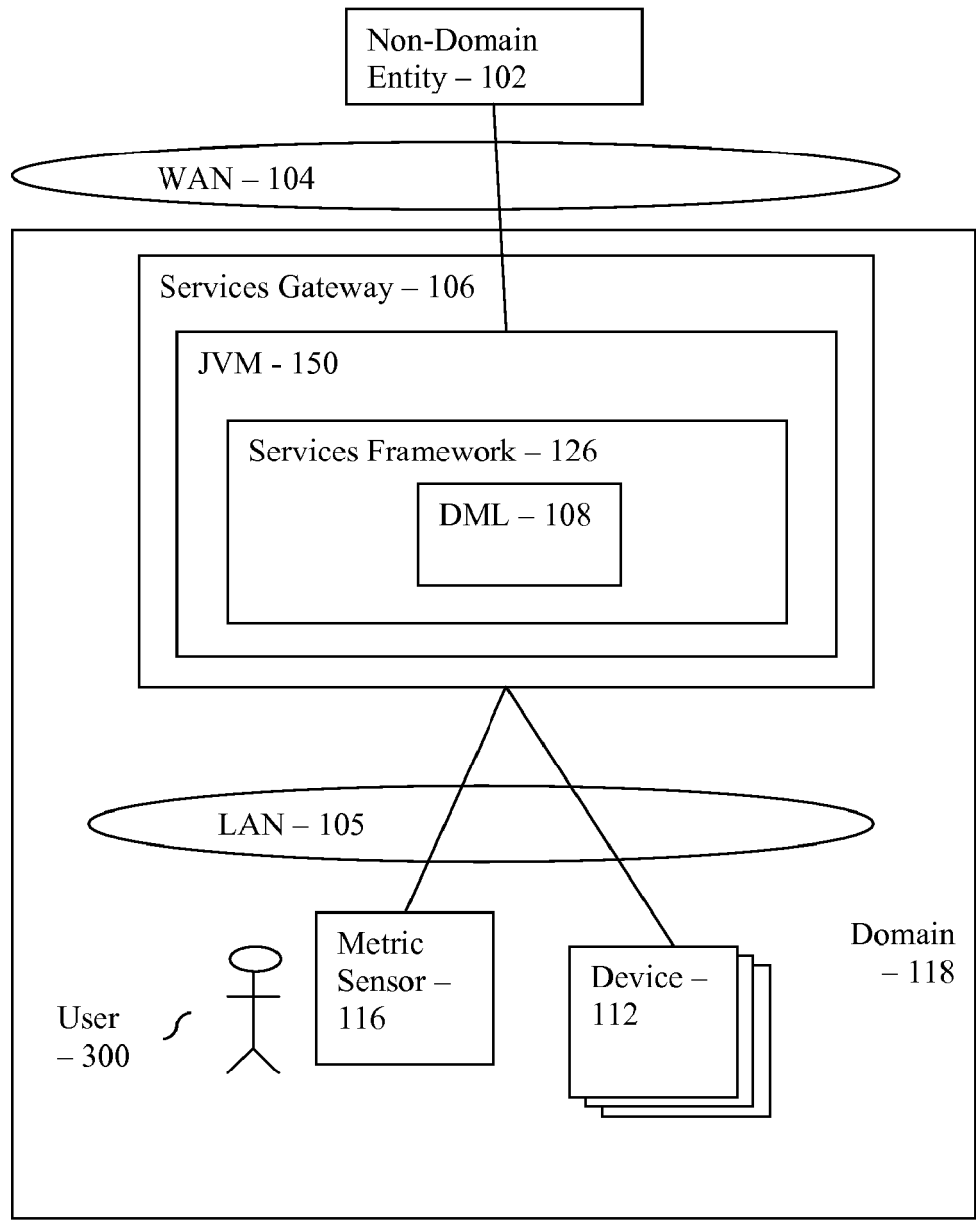
FIG. 1 is a block diagram illustrating an exemplary architecture useful in implementing methods for administering devices in accordance with the present invention.

The present invention is described to a large extent in this specification in terms of methods for administering devices. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DEFINITIONS

"802.11" refers to a family of specifications developed by the IEEE for wireless LAN technology. 802.11 specifies an over-the-air interface between a wireless client and a base station or between two wireless clients.

"API" is an abbreviation for "application programming interface." An API is a set of routines, protocols, and tools for building software applications.

"Bluetooth" refers to an industrial specification for a short-range radio technology for RF couplings among client devices and between client devices and resources on a LAN or other network. An administrative body called the Bluetooth Special Interest Group tests and qualifies devices as Bluetooth compliant. The Bluetooth specification consists of a 'Foundation Core,' which provides design specifications, and a 'Foundation Profile,' which provides interoperability guidelines.

"Coupled for data communications" means any form of data communications, wireless, 802.11b, Bluetooth, infrared, radio, internet protocols, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of connection for data communications as will occur to those of skill in the art. Couplings for data communications include networked couplings for data communications. Examples of networks useful with various embodiments of the invention include cable networks, intranets, extranets, internets, local area networks, wide area networks, and other network arrangements as will occur to those of skill in the art. The use of any networked coupling among television channels, cable channels, video providers, telecommunications sources, and the like, is well within the scope of the present invention.

"Driver" means a program that controls a device. A device (printer, disk drive, keyboard) typically has a driver. A driver acts as translator between the device and software programs that use the device. Each device has a set of specialized commands that its driver knows. Software programs generally access devices by using generic commands. The driver, therefore, accepts generic commands from a program and then translates them into specialized commands for the device.

"ESN" is an abbreviation for "Electronic Serial Number." An ESN is a serial number programmed into a device, such as, for example, a coffeepot, to uniquely identify the device.

"Field"—In this specification, the terms "field" and "data element," unless the context indicates otherwise, generally are used as synonyms, referring to individual elements of digital data. Aggregates of data elements are referred to as "records" or "data structures." Aggregates of records are referred to as "tables" or "files." Aggregates of files or tables are referred to as "databases." Complex data structures that include member methods, functions, or software routines as well as data elements are referred to as "classes." Instances of classes are referred to as "objects" or "class objects."

"HAVi" stands for 'Home Audio Video interoperability,' the name of a vendor-neutral audio-video standard particularly for home entertainment environments. HAVi allows different home entertainment and communication devices (such as VCRs, televisions, stereos, security systems, and video monitors) to be networked together and controlled from one primary device, such as a services gateway, PC, or television. Using IEEE 1394, the 'Firewire' specification, as the interconnection medium, HAVi allows products from different vendors to comply with one another based on defined connection and communication protocols and APIs. Services provided by HAVi's distributed application system include an addressing scheme and message transfer, lookup for discovering resources, posting and receiving local or remote events, and streaming and controlling isochronous data streams.

"HomePlug" stands for The HomePlug Powerline Alliance. HomePlug is a not-for-profit corporation formed to provide a forum for the creation of open specifications for high speed home powerline networking products and services. The HomePlug specification is designed for delivery of Internet communications and multimedia to homes through the home power outlet using powerline networking standards.

The HomePlug protocol allows HomePlug-enabled devices to communicate across powerlines using Radio Frequency signals (RF). The HomePlug protocol uses Orthogonal Frequency Division Multiplexing (OFDM) to split the RF signal into multiple smaller sub-signals that are then transmitted from one HomePlug enabled-device to another HomePlug-enabled device at different frequencies across the powerline.

"HTTP" stands for 'HyperText Transport Protocol,' the standard data communications protocol of the World Wide Web.

"ID" abbreviates "identification" as used by convention in this specification with nouns represented in data elements, so that 'user ID' refers to a user identification and 'userID' is the name of a data element in which is stored a user identification. For a further example of the use of 'ID': 'metric ID' refers to a metric identification and 'metricID' is the name of a data element in which is stored a metric identification.

"IEEE 1394" is an external bus standard that supports data transfer rates of up to 400 Mbps (400 million bits per second). Apple, which originally developed IEEE 1394, uses the trademarked name "FireWire." Other companies use other names, such as i.link and Lynx, to describe their 1394 products.

A single 1394 port can be used to connect up to 63 external devices. In addition to high speed, 1394 also supports isochronous data transfer—delivering data at a guaranteed rate. This makes it ideal for devices that need to transfer high levels of data in real-time, such as video.

"The Internet" is a global network connecting millions of computers utilizing the 'internet protocol' or 'IP' as the network layer of their networking protocol stacks. The Internet is decentralized by design. Each computer on the Internet is independent. Operators for each computer on the Internet can choose which Internet services to use and which local services to make available to the global Internet community. There are a variety of ways to access the Internet. Many online services, such as America Online, offer access to some Internet services. It is also possible to gain access through a commercial Internet Service Provider (ISP). An "internet" (uncapitalized) is any network using IP as the network layer in its network protocol stack.

"JAR" is an abbreviation for 'Java archives' JAR is a file format used to bundle components used by a Java application. JAR files simplify downloading applets, because many components (class files, images, sounds, etc.) can be packaged into a single file. JAR also supports data compression, which further decreases download times. By convention, JAR files end with a 'jar' extension.

"JES" stands for Java Embedded Server. JES is a commercial implementation of OSGi that provides a framework for development, deployment, and installation of applications and services to embedded devices.

"LAN" is an abbreviation for "local area network." A LAN is a computer network that spans a relatively small area. Many LANs are confined to a single building or group of buildings. However, one LAN can be connected to other LANs over any distance via telephone lines and radio waves. A system of LANs connected in this way is called a wide-area network (WAN). The Internet is an example of a WAN.

"LonWorks" is a networking platform available from Echelon®. Lon Works is currently used in various network applications such as appliance control and lighting control. The LonWorks networking platform uses a protocol called "Lon-Talk" that is embedded within a "Neuron Chip" installed within Lon Works-enabled devices.

The Neuron Chip is a system-on-a-chip with multiple processors, read-write and read-only memory (RAM and ROM), and communication and I/O subsystems. The read-only memory contains an operating system, the LonTalk protocol, and an I/O function library. The chip has non-volatile memory for configuration data and for application programs, which can be downloaded over a LonWorks network to the device. The Neuron Chip provides the first 6 layers of the standard OSI network model. That is, the Neuron Chip provides the physical layer, the data link layer, the network layer, the transport layer, the session layer, and the presentation layer.

The Neuron Chip does not provide the application layer programming. Applications for LonWorks networks are written in a programming language called "Neuron C." Applications written in Neuron C are typically event-driven, and therefore, result in reduced traffic on the network.

"OSGI" refers to the Open Services Gateway Initiative, an industry organization developing specifications for services gateways, including specifications for delivery of service bundles, software middleware providing compliant data communications and services through services gateways. The Open Services Gateway specification is a java based application layer framework that gives service providers, network operator device makers, and appliance manufacturer's vendor neutral application and device layer APIs and functions.

The "OSI Model" or Open System Interconnection, model defines a networking framework for implementing protocols in seven layers. Control is passed from one layer to the next, starting at the application layer in one network station, proceeding to the bottom layer, over the channel to the next network station and back up the hierarchy.

The seventh layer of the OSI model is the application layer. The application layer supports application and end-user processes. The application layer provides application services for file transfers, email, and other network software services.

The sixth layer of the OSI model is the presentation layer. The presentation layer provides independence from differences in data representation. The presentation layer translates from application data format to network data format, and vice versa. The presentation layer is sometimes called the "syntax layer."

The fifth layer of the OSI model is the session layer. The session layer establishes, manages, and terminates connections between networked applications. The session layer sets up, coordinates, and terminates conversations, exchanges, and dialogues between networked applications.

The fourth layer of the OSI model is the transport layer. The transport layer provides transparent transfer of data between networked systems, or hosts. The transport layer is also responsible for flow control and ensures complete data transfer.

The third layer of the OSI model is the network layer. The network layer creates logical paths, known as virtual circuits, for transmitting data from one network node to another network node. Routing, forwarding, addressing, and packet sequencing are functions of the network layer.

The second layer of the OSI model is the data link layer. The data link layer decodes data packets into bits and codes bits into data packets. The data link layer provides a transmission protocol and manages data flow transmission in the in the physical layer.

The data link layer is divided into two sublayers. The first sublayer of the data link layer is the Media Access Control (MAC) layer. The MAC sublayer controls access and permission for a computer on a network to transmit data.

The second sublayer of the data link layer is the Logical Link Control (LLC) layer. The LLC layer controls data flow transmission in the physical layer.

The first layer of the OSI model is the physical layer. The physical layer transmits the bit stream (electrical impulse, light or radio signal) through the physical network at the electrical and mechanical level. The physical layer provides the hardware for sending and receiving data.

"SMF" stands for "Service Management Framework™" available from IBM®. SMF is a commercial implementation of OSGi for management of network delivered applications on services gateways.

"USB" is an abbreviation for "universal serial bus." USB is an external bus standard that supports data transfer rates of 12 Mbps. A single USB port can be used to connect up to 127 peripheral devices, such as mice, modems, and keyboards. USB also supports Plug-and-Play installation and hot plugging.

"WAP" refers to the Wireless Application Protocol, a protocol for use with handheld wireless devices. Examples of wireless devices useful with WAP include mobile phones, pagers, two-way radios, and hand-held computers. WAP supports many wireless networks, and WAP is supported by many operating systems. Operating systems specifically engineered for handheld devices include PalmOS, EPOC, Windows CE, FLEXOS, OS/9, and JavaOS. WAP devices that use displays and access the Internet run "microbrowsers." The microbrowsers use small file sizes that can accommodate the low memory constraints of handheld devices and the low-bandwidth constraints of wireless networks.

The "X-10" means the X-10 protocol. Typical X-10 enabled devices communicate across AC powerline wiring, such as existing AC wiring in a home, using an X-10 transmitter and an X-10 receiver. The X-10 transmitter and the X-10 receiver use Radio Frequency (RF) signals to exchange digital information. The X-10 transmitter and the X-10 receiver communicate with short RF bursts which represent digital information. A Binary 1 is represented by a 1 millisecond burst of 120 KHz. and a Binary 0 by the absence of 120 KHz burst followed by the presence of a burst.

In the X-10 protocol, data is sent in data strings called frames. The frame begins with a 4 bit start code designated as "1110." Following the start code, the frame identifies a particular domain, such as house, with a 4 bit "house code," and identifies a device within that domain with a 4 bit "devices code." The frame also includes a command string of 8 bits identifying a particular preset command such as "on," "off," "dim," "bright," "status on," "status off," and "status request."

"XML" stands for 'eXtensible Markup Language,' a language that support user-defined markup including user-defined elements, tags, and attributes. XML's extensibility contrasts with most web-related markup languages, such as HTML, which are not extensible, but which instead use a standard defined set of elements, tags, and attributes. XML's extensibility makes it a good foundation for defining other languages. WML, the Wireless Markup Language, for example, is a markup language based on XML. Modem browsers and other communications clients tend to support markup languages other than HTML, including, for example, XML.

Exemplary Architecture

FIG. 1 is a block diagram of exemplary architecture useful in implementing methods of administering devices in accordance with embodiments of the present invention. The architecture of FIG. 1 includes a domain (118). The term "domain" in this specification means a particular networked environment. Examples of various domains include home networks, car networks, office network, and others as will occur to those of skill in the art.

The domain (118) of FIG. 1 includes a services gateway (106). A services gateway (106) is, in some exemplary architectures, an OSGi compatible services gateway (106). While exemplary embodiments of methods for administering devices are described in this specification using OSGi, many other applications and frameworks, will work to implement the methods of administering devices according to the present invention, and are therefore also well within the scope of the present invention. Commercial implementations of OSGi, such as JES and SMF, are also useful in implementing methods of the present invention.

In the exemplary architecture of FIG. 1, the services gateway (126) includes a services framework (126). The services framework (126) of FIG. 1 is a hosting platform for running 'services'. Services are the main building blocks for creating applications in the OSGi. An OSGi services framework (126) is written in Java and therefore, typically runs on a Java Virtual Machine (JVM) (150).

The exemplary architecture of FIG. 1 includes a DML (108). "DML" (108) is an abbreviation for Domain Mediation Layer. In many typical embodiments of the architecture of FIG. 1, the DML (108) is application software useful in implementing methods of administering devices in accordance with the present invention. In some embodiments of the present invention, the DML is OSGi compliant application software, and is therefore implemented as a service or a group of services packaged as a bundle installed on the services framework (126). In this specification, DMLs are often discussed in the context of OSGi. However, the discussion of OSGI is for explanation and not for limitation. In fact, DMLs according to various embodiments of the present invention can be implemented in any programming language, C, C++, COBOL, FORTRAN, BASIC, and so on, as will occur to those of skill in the art, and DMLs developed in languages other than Java are installed directly upon an operating system or operating environment rather than a JVM.

In the exemplary architecture of FIG. 1, the services gateway (106) is coupled for data communications with a metric sensor (116). A metric sensor (116) is a device that reads an indication of a user's condition, and creates a user metric in response to the indication of the user's condition. An "indication of a user's condition" is a quantifiable aspect of a user's condition and a quantity measuring the aspect. For example, a quantifiable aspect of a user's condition is a body temperature of 99.2 degrees Fahrenheit. Examples of quantifiable aspects of a user's condition include body temperature, heart rate, blood pressure, location, galvanic skin response, and others as will occur to those of skill in the art.

A "user metric" is a data structure representing an indication of user condition. In many examples of methods for administering devices in accordance with the present invention, a user metric is implemented as a data structure, class, or object that includes a userID field, a metricID field, and a metric value field. A typical userID field identifies the user whose indication of condition is represented by the metric. A typical metricID field identifies the quantifiable aspect of user condition the metric represents, such as, for example, blood pressure, heart rate, location, or galvanic skin response. A typical metric value field stores a quantity measuring the aspect of a user's condition.

Wearable and wireless heart rate monitors, galvanic skin response monitors, eye response monitors, and breathing monitors useful as or easily adaptable for use as metric sensors are currently available from Quibit Systems, Inc. The 'Polar' series of heart rate monitors from Body Trends, Inc., and the magnetoelastic gastric pH sensors from Sentec Corporation are other examples of readily available biomedical sensors useful as or easily adaptable for use as metric sensors.

In order for a conventional sensor, such as a biomedical sensor, to be useful as a metric sensor that transmits multiple metric types, in a domain containing multiple users, the sensor advantageously transmits not only a value of the each aspect it measures, but also transmits a user ID and a metricID. The user ID is useful because typical embodiments of the present invention include a DML capable of administering devices on behalf of many users simultaneously. The metricID is useful because a single user may employ more than one metric sensor at the same time or employ a metric sensor capable of monitoring and transmitting data regarding more than one aspect of user condition. All wireless sensors at least transmit a metric value according to some wireless data communications protocol. To the extent that any particular sensor 'off-the-shelf' does not also transmit user ID or metricID, such a sensor is easily adapted, merely by small modifications of its controlling software, also to include in its transmissions user IDs and metricID.

Although it is expected that most DML will support metric IDs and user IDs, it is possible, under some circumstances within the scope of the present invention, to use an off-the-shelf sensor as a metric sensor even if the sensor does not provide metric ID and user ID in its output telemetry. Consider an example in which only a single person inhabits a domain having device controlled or administered by a DML tracking only a single metric, such as, for example, heart rate. A DML tracking only one metric for only one user could function without requiring a metric type code in telemetry received from the metric sensor because, of course, only one type of metric is received. In this example, strictly speaking, it would be possible for an off-the-shelf, Bluetooth-enabled heart rate sensor, such as a 'Polar' sensor from Body Trends, to function as a metric sensor. This example is presented only for explanation, because as a practical matter it is expected that most DMLs according to embodiments of the present invention will usefully and advantageously administer more than one type of metric (therefore needing a metric ID code in their telemetry) on behalf of more than one user (therefore needing a user ID in their telemetry).

In many typical embodiments of the present invention, the metric sensor is advantageously wirelessly coupled for data communications with the services gateway (106). In many alternative embodiments, the metric sensor transmits the user metric to the DML through a services gateway using various protocols such as Bluetooth, 802.11, HTTP, WAP, or any other protocol that will occur to those of skill in the art.

In the exemplary architecture of FIG. 1, the domain (118) includes a device (112) coupled for data communications with the services gateway (106) across a LAN (105). In many typical embodiments of the present invention, a domain (118) will include many devices. A home domain, for example, may include a home network having a television, numerous lights, a refrigerator, a freezer, a coffee pot, a dishwasher, a dryer, a CD player, a DVD player, a personal video recorder, or any other networkable device that will occur to those of skill in the art. For ease of explanation, the exemplary architecture of FIG. 1 illustrates only three devices (112), but the use of any number of devices is well within the scope of the present invention.

To administer the device (112), the DML must have the device class for the device containing accessor methods that get and set attributes on the device, and in some cases, a communication class that provides the protocols needed to communicate with the device. In some examples of the architecture of FIG. 1, a DML has pre-installed upon it, device classes and communications classes for many devices that the DML supports.

To the extent the DML does not have a preinstalled device class and communications class for a particular device, the DML can obtain the device class and communications class in a number of ways. One way the DML obtains the device class and communications class for the device is by reading the device class and the communications class from the device. This requires the device have enough installed memory to store the device class and communications class. The DML can also obtain the device class and communications class from devices that do not contain the device class or communications class installed upon them. One way the DML obtains the device class and communications class is by reading a device ID from the device, searching the Internet for the device class and communications class, and downloading them. Another way the DML obtains the device class and communications class is by reading a network location from the device downloading, from the network location, the device class and communications class. Three ways have been described for obtaining the device classes and communications classes needed to administer devices in accordance with the present invention. Other methods will also occur to those of skill in the art.

The exemplary architecture of FIG. 1 includes a non-domain entity (102) that is coupled for data communications with the services gateway (106) across a WAN (104). A "non-domain entity" is any computing device or network location coupled for data communications to the domain but not within the domain. The phrase "non-domain entity" is broad and its inclusion in the architecture of FIG. 1 acknowledges that in many typical embodiments of architecture useful in implementing methods of administering devices in accordance with the present invention, a given domain is coupled for data communications with outside non-domain entities.

An example of a non-domain entity is a web server (outside the domain) of a manufacturer of the device (112) installed within the domain. The manufacturer may operate a website that makes available for download drivers for the device, updates for the device, or any other information or software for the device. Drivers, updates, information or software for the device are downloadable to the device across a WAN and through the services gateway.

Figure 2:
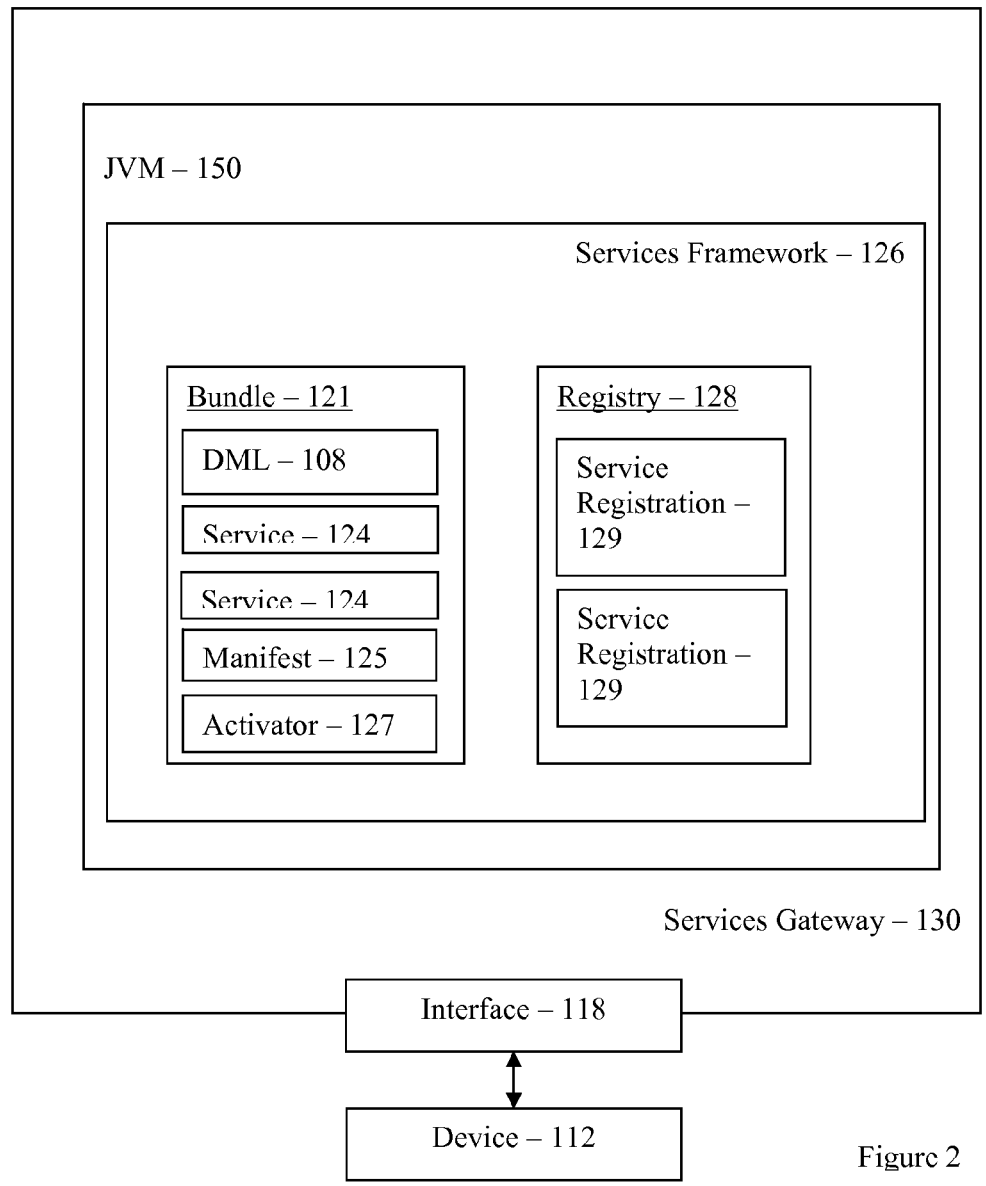
FIG. 2 is a block diagram illustrating an exemplary services gateway.

FIG. 2 is a block diagram of an exemplary services gateway (106) useful in implementing methods of administering devices according to the present invention. The services gateway (106) of FIG. 2 is, in some exemplary architectures useful in embodiments of the present invention, an OSGi compatible services gateway (106). While exemplary embodiments of methods for administering a device are described in this specification using OSGi, many other applications and frameworks other than OSGi will work to implement methods of administering devices according to the present invention and are therefore well within the scope of the present invention. Commercial implementations of OSGi, such as JES and SMF, are also useful in implementing methods of the present invention.

OSGi Stands for 'Open Services Gateway Initiative.' The OSGi specification is a Java-based application layer framework that provides vendor neutral application and device layer APIs and functions for various devices using arbitrary communication protocols operating in networks in homes, cars, and other environments. OSGi works with a variety of networking technologies like Ethernet, Bluetooth, the 'Home, Audio and Video Interoperability standard' (HAVi), IEEE 1394, Universal Serial Bus (USB), WAP, X-10, Lon Works, HomePlug and various other networking technologies. The OSGi specification is available for free download from the OSGi website at www.osgi.org.

The services gateway (130) of FIG. 2 includes a service framework (126). In many example embodiments the service framework is an OSGi service framework (126). An OSGi service framework (126) is written in Java and therefore, typically runs on a Java Virtual Machine (JVM). In OSGi, the service framework (126) of FIG. 1 is a hosting platform for running 'services' (124). The term 'service' or 'services' in this disclosure, depending on context, generally refers to OSGi-compliant services.

Services (124) are the main building blocks for creating applications according to the OSGi. A service (124) is a group of Java classes and interfaces that implement a certain feature. The OSGi specification provides a number of standard services. For example, OSGi provides a standard HTTP service that creates a web server that can respond to requests from HTTP clients.

OSGi also provides a set of standard services called the Device Access Specification. The Device Access Specification ("DAS") provides services to identify a device connected to the services gateway, search for a driver for that device, and install the driver for the device.

Services (124) in OSGi are packaged in 'bundles' (121) with other files, images, and resources that the services (124) need for execution. A bundle (121) is a Java archive or 'JAR' file including one or more service implementations (124), an activator class (127), and a manifest file (125). An activator class (127) is a Java class that the service framework (126) uses to start and stop a bundle. A manifest file (125) is a standard text file that describes the contents of the bundle (121).

In the exemplary architecture of FIG. 2 includes a DML (108). In many embodiments of the present invention, the DML is an OSGi service that carries out methods of administering devices. The DML (108) of FIG. 2 is packaged within a bundle (121) and installed on the services framework (126).

The services framework (126) in OSGi also includes a service registry (128). The service registry (128) includes a service registration (129) including the service's name and an instance of a class that implements the service for each bundle (121) installed on the framework (126) and registered with the service registry (128). A bundle (121) may request services that are not included in the bundle (121), but are registered on the framework service registry (128). To find a service, a bundle (121) performs a query on the framework's service registry (128).

Administering Devices in Dependence Upon User Metrics

Figure 3:
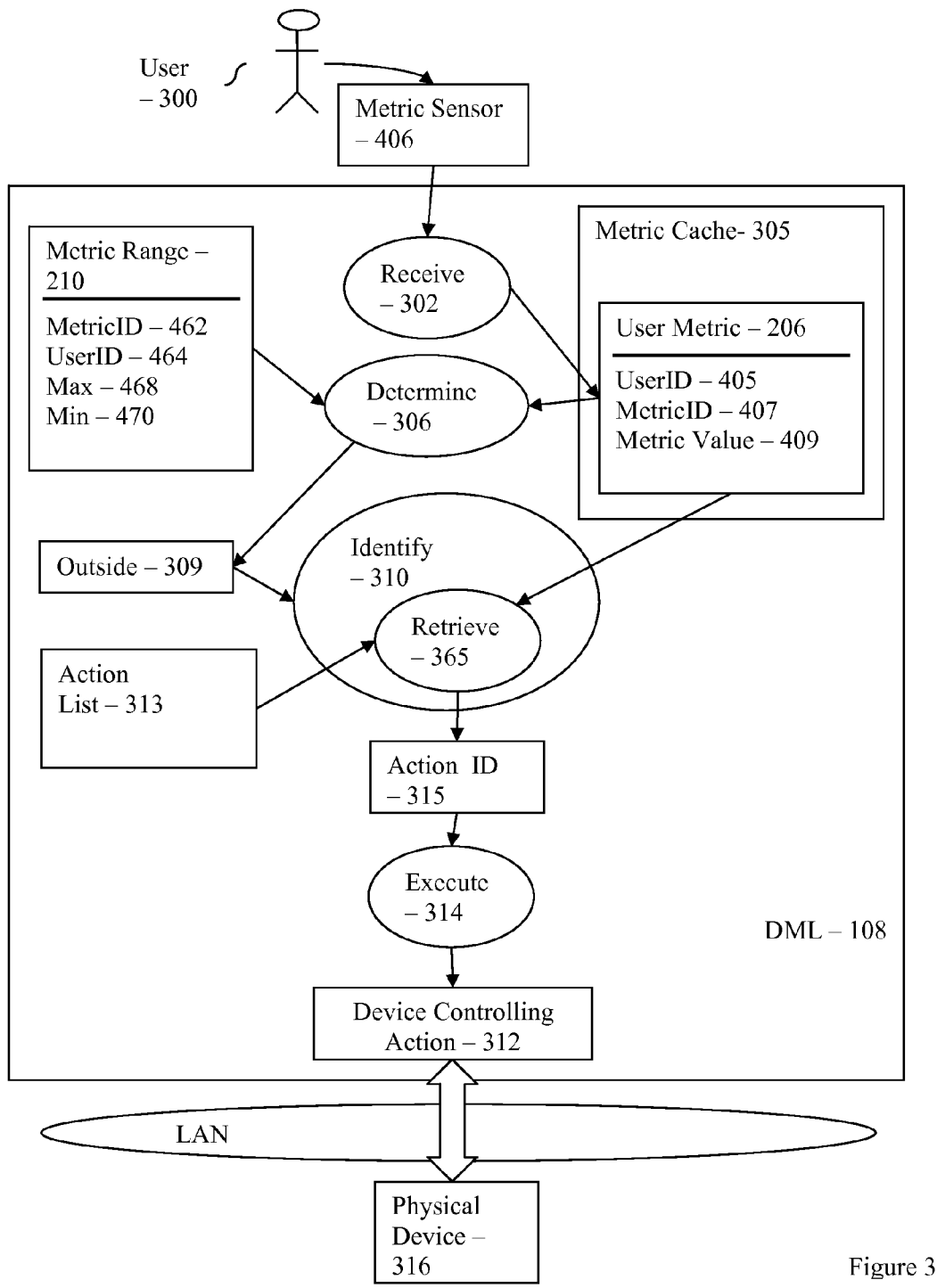
FIG. 3 is a data flow diagram illustrating an exemplary method of administering devices in accordance with the present invention.

FIG. 3 is a data flow diagram illustrating an exemplary method for administering devices. The method of FIG. 3 includes receiving (302) a user metric (206). As mentioned above, a "user metric" comprises data describing an indication of user condition. An "indication of a user's condition" is a quantifiable aspect of a user's condition and a quantity measuring the aspect. Examples of quantifiable aspects of a user's condition include body temperature, heart rate, blood pressure, location, galvanic skin response, or any other aspect of user condition as will occur to those of skill in the art.

In typical embodiments of the present invention, a user metric is implemented as a user metric data structure or record (206), such as the exemplary user metric (206) of FIG. 3. The user metric of FIG. 3 includes a userID field (405) identifying the user whose indication of condition is represented by the metric. The user metric (206) of FIG. 3 also includes a metric ID field (407) identifying the aspect of user condition the metric represents, such as, for example, blood pressure, heart rate, location, or galvanic skin response. The user metric (204) also includes a value field (409) containing the value of the aspect of the user's condition that the metric represents. An example of a value of a metric is a body temperature of 100° Fahrenheit.

In many typical embodiments of the method of FIG. 3, receiving (302) a user metric includes receiving a user metric from a metric sensor (406). In some examples of the method of FIG. 3, the metric sensor (300) reads an indication of a user's condition, creates a user metric in dependence upon the indication of a user's condition, and transmits the user metric to a DML. In many typical embodiments, the metric sensor transmits the user metric to the DML in a predefined data structure, such as the metric (206) of FIG. 3, to the DML using, for example, protocols such as Bluetooth, 802.11, HTTP, WAP, or any other protocol that will occur to those of skill in the art.

In the method of FIG. 3, receiving (302) a user metric includes receiving a user metric into metric cache memory (305), that is, received by a DML and then stored in cache. In many typical embodiments of the method of FIG. 3, metric cache memory (305) is cache memory available to a DML to facilitate carrying out steps of administering devices in accordance with the present invention.

The method of FIG. 3 includes determining (306) whether a value of the user metric is outside (309) of a predefined metric range. A predefined metric range includes a predetermined range of values for a given metric ID for a particular user. In many typical embodiments of the method of FIG. 3, the predefined metric range is designed as a range of typical or normal metrics values for a user. One example of a predefined metric range is a range of metric values representing a resting heart rate of 65-85 beats per minute.

In many typical embodiments of the method of FIG. 3, a predefined metric range for a user is implemented as a data structure or record such as the metric range record (210) of FIG. 3. The metric range of FIG. 3 includes a metric ID field (462) identifying the kind of user metrics. The metric range of FIG. 3 includes a user ID field (464) identifying the user for whom the metric range represents a range of metric values. The metric range of FIG. 3, for example, includes a Max field (468) representing the maximum metric value of the metric range and a Min field (470) representing the minimum metric value of the metric range. That is, in typical embodiments, it is a maximum and minimum metric value in a range that defines a value range for the metric.

In many typical embodiments, determining (306) that the value of the user metric (206) is outside (309) of a predefined metric range includes comparing the metric value of a user metric with the maximum and minimum values from a metric range for that metric and for the same user. In many examples of the method of FIG. 3, determining that a user metric is outside a predefined metric range also includes determining that the metric value (409) of the user metric (206) is either greater than the maximum value (468) of the metric range (210) or below the minimum value (470) of the range in the metric range (210). A user metric of metric ID identifying the metric as 'heart rate' having, for example, a metric value of 100 beats per minute is outside the exemplary metric range for resting heart rate of 65-85 beats per minute.

If the value of the user metric is outside of the metric range, the method of FIG. 3 includes identifying (310) an action in dependence upon the user metric. An action includes one or more computer programs, subroutines, or member methods that when executed, control one or more devices. Actions are typically implemented as object oriented classes and manipulated as objects or references to objects. In fact, in this specification, unless context indicates otherwise, the terms 'action,' 'action object,' and 'reference to an action object' are treated more or less as synonyms. In many embodiments of the method of FIG. 3, an action object calls member methods in a device class to affect current attributes of the physical device. In many embodiments of the method of FIG. 3, action classes or action objects are deployed in OSGi bundles to a DML on a services gateway.

In the method of FIG. 3, identifying (310) an action includes retrieving (365) an action ID (315) from an action list (313) organized by user ID and metric ID. In the method of FIG. 3, retrieving an action ID from an action list includes retrieving from a list the identification of the action (the 'action ID') to be executed when a value of a metric of a particular metric ID and for a particular user is outside of the user's predetermined metric range. The action list can be implemented, for example, as a Java list container, as a table in random access memory, as a SQL database table with storage on a hard drive or CD ROM, and in other ways as will occur to those of skill in the art.

As mentioned above, the actions themselves comprise software, and so can be implemented as concrete action classes embodied, for example, in a Java package imported into the DML at compile time and therefore always available during DML run time. Executing (314) an action (312) therefore is often carried out in such embodiments by use of a switch( ) statement in the DML. Such a switch( ) statement can be operated in dependence upon the action ID and implemented, for example, as illustrated by the following segment of pseudocode:

```
switch (actionID) {
    Case 1: actionNumber1.take_action( ); break;
    Case 2: actionNumber2.take_action( ); break;
    Case 3: actionNumber3.take_action( ); break;
    Case 4: actionNumber4.take_action( ); break;
    Case 5: actionNumber5.take_action( ); break;
    // and so on
} // end switch( )
```

The exemplary switch statement selects a particular device controlling object for execution depending on the action ID. The device controlling objects administered by the switch( ) in this example are concrete action classes named actionNumber1, actionNumber2, and so on, each having an executable member method named 'take_action( ),' which carries out the actual work implemented by each action class.

Executing (314) an action (312) also is often carried out in such embodiments by use of a hash table in the DML. Such a hash table can store references to action object keyed by action ID, as shown in the following pseudocode example. This example begins by an action service's creating a hashtable of actions, references to objects of concrete action classes associated with a particular metric ID, using action IDs as keys. In many embodiments it is an action service that creates such a hashtable, fills it with references to action objects pertinent to a particular metric ID, and returns a reference to the hashtable to a calling metric object.

Hashtable ActionHashTable=new Hashtable( );
ActionHashTable.put("1", new Action1( ));
ActionHashTable.put("2", new Action2( ));
ActionHashTable.put("3", new Action3( ));

Executing a particular action then can be carried out according to the following pseudocode:

Action anAction=(Action) ActionHashTable.get("2");
if (anAction!=null) anAction.take_action( );

Many examples in this specification are described as implemented with lists, often with lists of actions, for example, returned with a reference to a list from an action service, for example. Lists often function in fashion similar to hashtables. Executing a particular action, for example, can be carried out according to the following pseudocode:

List ActionList=new List( );
ActionList.add(1, new Action1( ));
ActionList.add(2, new Action2( ));
ActionList.add(3, new Action3( ));

Executing a particular action then can be carried out according to the following pseudocode:

Action anAction=(Action) ActionList.get(2);
if (anAction!=null) anAction.take_action( );

The three examples just above use switch statements, hash tables, and list objects to explain executing actions according to embodiments of the present invention. The use of switch statements, hash tables, and list objects in these examples are for explanation, not for limitation. In fact, there are many ways of executing actions according to embodiments of the present invention, as will occur to those of skill in the art, and all such ways are well within the scope of the present invention.

Figure 4:
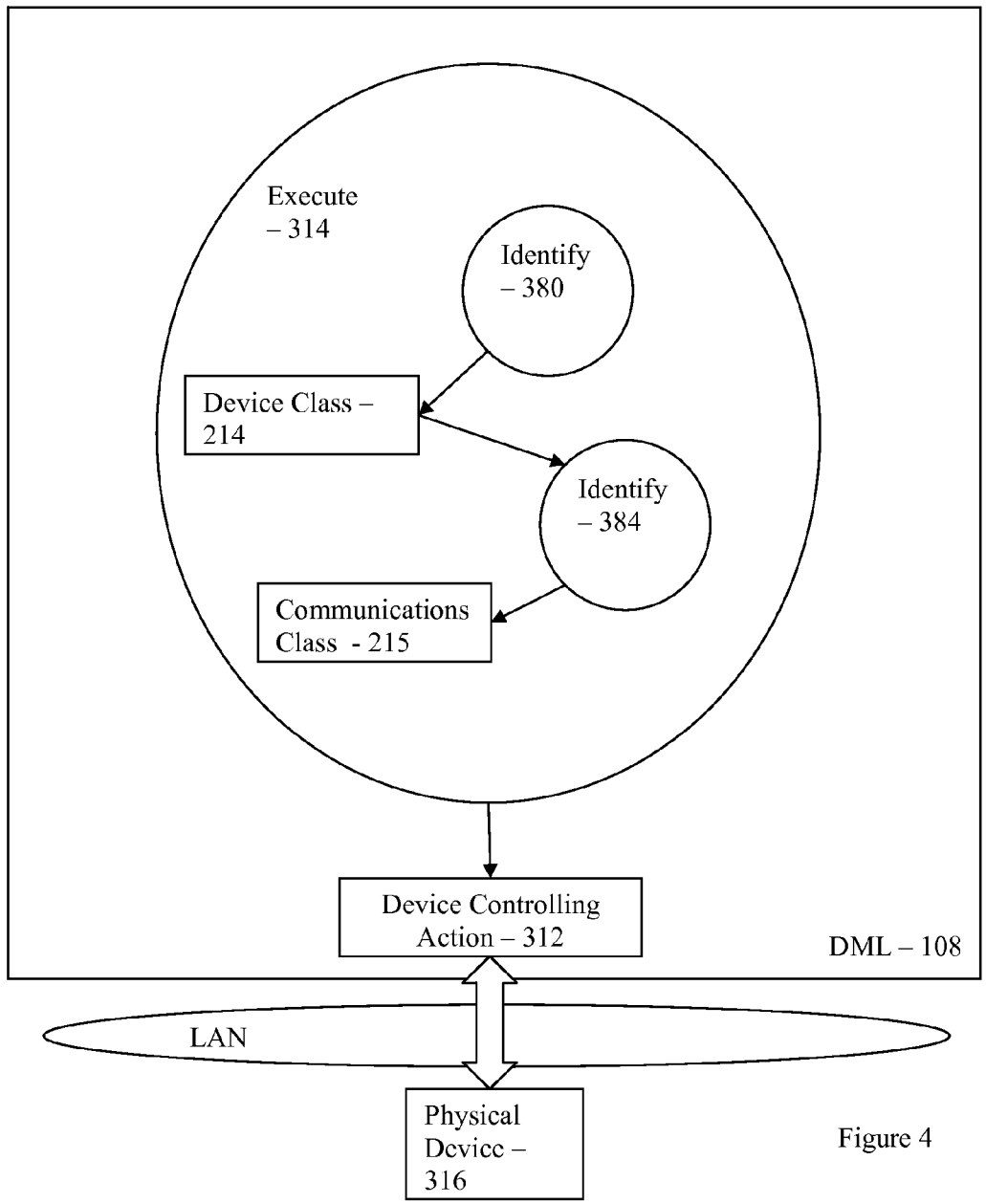
FIG. 4 is a data flow diagram illustrating an exemplary method of executing an action.

FIG. 4 sets forth a data flow diagram illustrating an exemplary method of executing an action. In the method of FIG. 3, executing an action includes identifying (380) a device class (214) representing a physical device (316) administered by the action. Typical device classes include member methods for administering the device. Typical member methods for administering the device include member methods for getting and setting values of device attributes in physical devices. In the case of a lamp supporting multiple settings for light intensity, for example, a member method get( ) in a device class can gets from the lamp a value for light intensity, and a member method set( ) in a device class sets the light intensity for the lamp.

In the method of FIG. 4, executing an action includes identifying (384) a communication class (215) for the physical device (316). To communicate the member methods of the device class to the physical device, a communications class implements a protocol for communicating with a physical device. Typical communications classes include member methods that construct, transmit, and receive data communications messages in accordance with the protocol implemented by a communication class. The member methods in a communication class transmit and receive data communications messages to and from a physical device. A communications class advantageously separates the protocols used to communicate with the physical device from the actions to be effected on the device, so that a device class interface comprising get( ) and set( ) methods, for example, can usefully communicate with a physical device by use of any data communications protocol with no need to reprogram the device class and no need to provide one device class for each combination of physical device and protocol.

For further explanation, consider the following brief use case. A user's metric sensor reads the user's heart rate at 100 beats per minute, and creates a metric for the user having a user ID identifying the user, a metric ID identifying the metric as "heart rate," and a metric value of 100. The metric sensor transmits the user metric to the DML through a services gateway. The DML receives the user metric and compares the user metric with the user' metric range for resting heart rates having a range of 65-85. The DML determines that the user metric is outside of the predefined metric range. The DML uses the user ID and the metric ID to retrieve from a list an action ID for a predefined action to be executed in response to the determination that the value of the user's heart rate metric value is outside the user's metric range for heart rate. The DML finds a device controlling-action ID identifying an action object having a class name of 'someAction,' for example, and also having an interface member method known to the DML, such as the take_action( ) method described above in the switch( ) statement.

In this example, the DML effects the action so identified by calling someAction.take_action( ). The take_action( ) method in this example is programmed to call a device service for a list of references to device objects representing physical devices whose attributes are to be affected by the action. The device service is programmed with a switch( ) statement to create in dependence upon the action ID a list of references to device objects and return the device list to the calling action object, or rather, to the calling take_action( ) method in the action object.

In creating the device list, the device service is programmed to instantiate each device having a reference entered in the list, passing as a constructor parameter a reference to a communications service. Each device so instantiated has a constructor programmed to call a parameterized factory method in the communications service, passing as a parameter an identification of the calling device object. The communications service then instantiates and returns to the device a reference to a communication object for the communications protocol needed for that device object to communicate with its corresponding physical device.

The principal control logic for carrying out an action typically, in embodiments of the present invention, resides in the principal interface method of an action class and objects instantiated from it. In this example, the take_action( ) method is programmed to carry out a sequence of controlling method calls to carry out the changes on the physical devices that this action class was developed to do in the first place. The take_action( ) method carries out this work with a series of calls to accessor methods (set( ) and get( ) methods) in the device objects in its device list.

Figure 5:
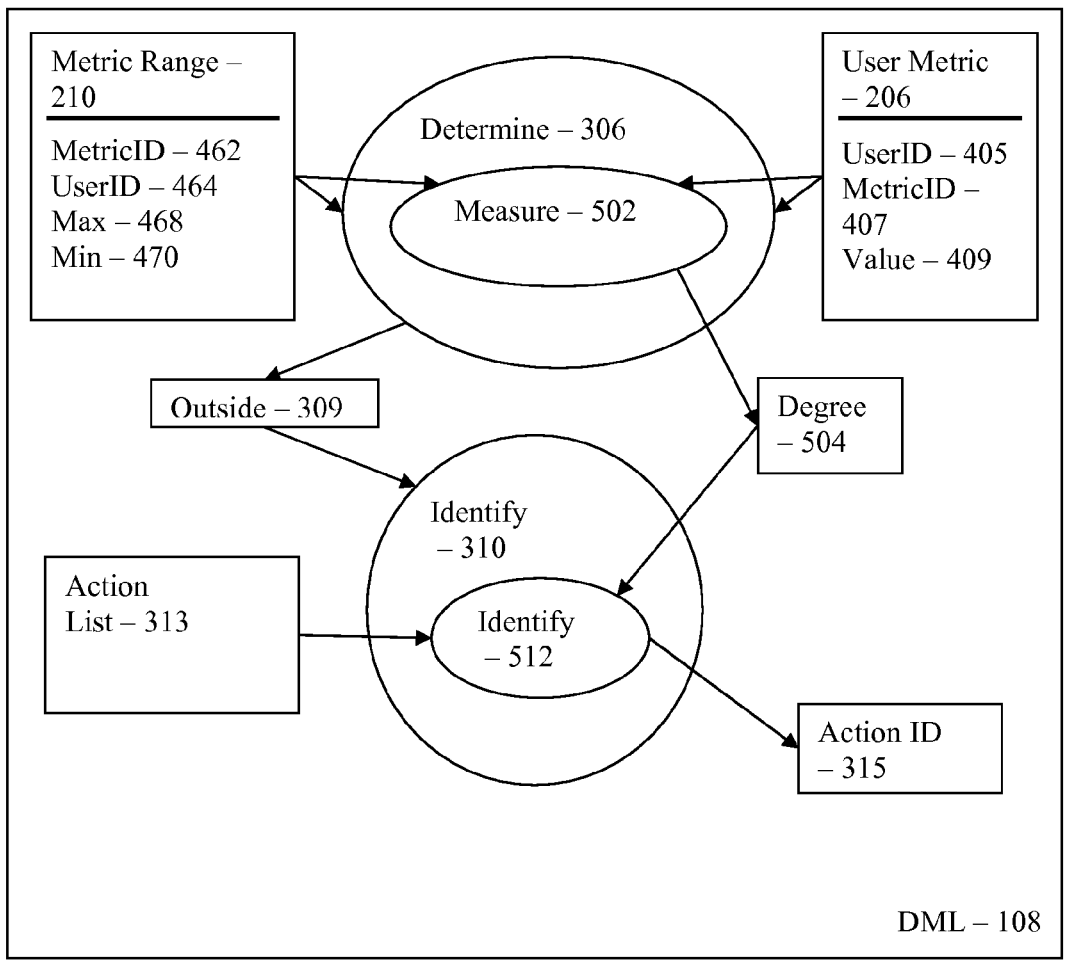
FIG. 5 is a data flow diagram illustrating an exemplary method of determining whether a user metric is outside a predefined metric range for the user in accordance with the present invention.

FIG. 5 is a data flow diagram illustrating an exemplary method of determining that the user metric is outside the predefined metric range. In many typical embodiments of methods for administering devices, the user metric is represented in data as a data structure or record, such as the user metric record of FIG. 5. The user metric (206) includes a user ID field (405), a metric ID field (407), and a value field (409).

In many examples of the present invention, the predefined metric range is represented in data as a data structure or record, such as the metric range record (210) of FIG. 5. The metric range (210) includes a metric ID field (462) identifying the metric to be compared with the metric range. The metric range of FIG. 5 includes a user ID field (464) identifying the user. The metric range of FIG. 5 includes a Max field (468) storing a maximum metric value of a predefined metric range and the Min field (470) storing a minimum metric value of the predefined metric range.

In the example of FIG. 5, a predefined metric range for a metric is represented in data as a metric range such as the metric range (210) of FIG. 5. The exemplary metric range (210) sets forth a maximum range value (468) and a minimum range value (470) for a particular user for a particular metric. The particular user and the particular metric for the exemplary range are identified respectively in a user ID field (464) and a metric ID field (462).

In the method of FIG. 5, determining (306) that value of the user metric (206) is outside (309) of a predefined metric range (210) includes measuring (502) a degree (504) to which the user metric (206) is outside (309) the predefined metric range (210). In many typical embodiments of the present invention, measuring (502) the degree (504) to which the user metric (206) is outside (309) the metric range (210) includes identifying the magnitude by which the value of the user metric is greater than the maximum metric value the metric range or the magnitude by which the value of the user metric value is less than the minimum value of the predefined metric range. To the extent that measuring the degree to which a metric is out of range includes identifying a measure as greater than a maximum range value or less than a minimum range value, the measurement often advantageously includes both a magnitude and an indication of direction, such as, for example, a sign (+ or −), an enumerated indication such as, for example, 'UP' or 'DOWN', or a Boolean indication such as true for high and false for low.

In the method of FIG. 5, identifying (310) an action in dependence upon the user metric includes identifying (512) an action in dependence upon the degree (504) to which the value of the user metric (206) is outside (309) the metric range and also often in dependence upon the direction in which the metric is out of range. In many embodiments of the method of FIG. 5, identifying (512) the action in dependence upon the degree (504) to which the user metric is outside of the predefined metric range includes retrieving an action ID from an action list (313) organized by metric ID, user ID, degree, and direction.

In many DMLs according to the present invention are preinstalled device classes for all of the devices the DML supports. Newly acquired physical devices identify themselves as being on the network and the DML associates the device ID with the device class already installed on the DML. In such an example embodiment, the DML identifies the device by associating the device ID with the pre-installed device class.

Administering Devices in Dependence Upon User Metric Vectors

Figure 6:
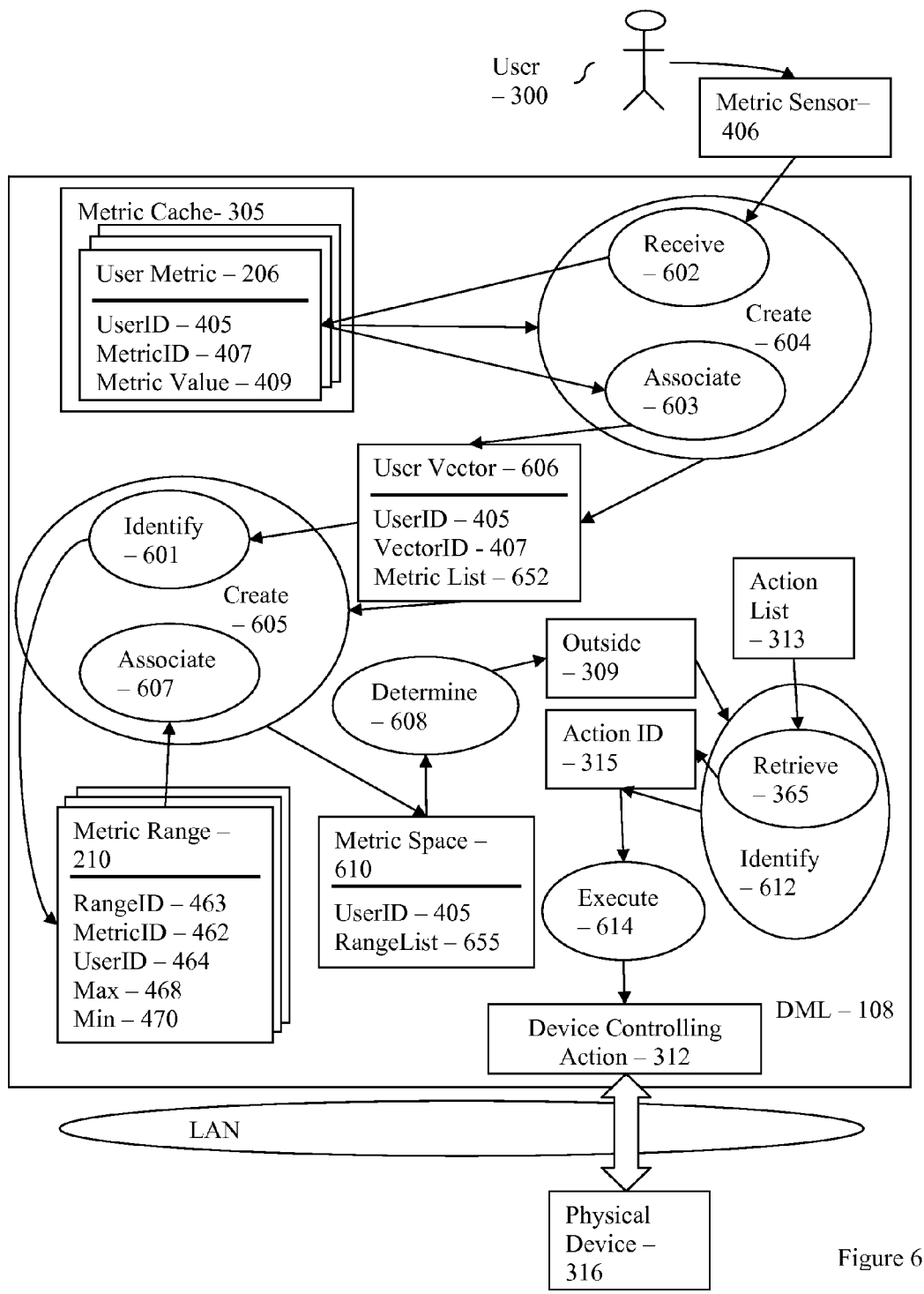
FIG. 6 is a data flow diagram illustrating an exemplary method of administering devices in accordance with the present invention.

Many exemplary embodiments of methods of administering devices in dependence upon user metrics have been discussed above. The previous section introduced user metrics and user metric ranges. With reference to FIG. 6, the present section of this disclosure introduces a user metric vector that is comprised of a plurality of user metrics and introduces a user metric space that is comprised of a plurality of metric ranges.

FIG. 6 is a data flow diagram illustrating an exemplary method of administering devices in accordance with the present invention. The method of FIG. 6 includes creating (604) a user metric vector (606) comprising a plurality of disparate user metrics (206). As discussed in the previous section, a user metric represents an indication of user condition defined as a single quantifiable aspect of a user's condition and a quantity measuring the aspect. A user metric vector comprised of a plurality of disparate user metrics represents a complex indication of user condition having multiple quantifiable aspects of a user's condition and multiple quantities measuring the aspects.

The term 'disparate' user metrics means user metrics of different kinds. Therefore, the user metric vector (606) being comprised of a plurality of disparate user metrics is a complex indication of a user's condition comprising a plurality of different kinds of aspects of user condition and plurality of quantities measuring those aspect. In many embodiments of the method of FIG. 6, the user metric vector (606) comprises references the current user metric objects instantiated by a metric service. The current user metric objects of different kinds provide a current snapshot of a user's condition.

In typical embodiments of the present invention, a user metric vector is implemented as a user metric vector data structure or record (606), such as the exemplary user metric vector (606) of FIG. 6. The user metric vector (606) includes a user ID (405) identifying the user and a metric vector ID (407) uniquely identifying the user metric vector. The user metric vector (606) also includes data storage for a metric list (652) containing references to disparate user metrics.

In the method of FIG. 6, creating (604) a user metric vector (606) includes receiving (602) a plurality of disparate user metrics (206) having a plurality of metric values (409) and a plurality of disparate metric IDs (407). In many typical embodiments of the method of FIG. 6, receiving (602) a plurality of disparate user metrics (206) includes receiving disparate user metrics from one or more metric sensors (406). In some examples of the method of FIG. 6, the metric sensor (300) reads an indication of a user's condition, creates a user metric in dependence upon the indication of a user's condition, and transmits the user metric to a DML. In many typical embodiments, the metric sensor transmits the user metric to the DML in a predefined data structure, such as the metric (206) of FIG. 3, to the DML using, for example, protocols such as Bluetooth, 802.11, HTTP, WAP, or any other protocol that will occur to those of skill in the art.

In the method of FIG. 6, creating (604) a user metric vector (606) include associating (603) the plurality of disparate user metrics (206) with the user metric vector (606). 'Associated,' generally in this disclosure and subject to context, means associated by reference. That is, saying that an object of one class is associated with another object means that the second object possesses a reference to the first. The objects can be mutually associated, each possessing a reference to the other. Other relations among objects, aggregation, composition, and so on, are usually types of association, and the use of any of them, as well as others as will occur to those of skill in the art, is well within the scope of the present invention. In the exemplary method of FIG. 6, associating (603) the plurality of disparate user metrics (206) with the user metric vector (606) is carried out by providing references to a plurality of disparate metric objects in the user metric vector (606)

In some exemplary embodiments, the user metric vector is implemented as an object instantiated by a metric vector service. In some such embodiments, when a DML receives a metric, the DML passes the metric to a metric service that instantiates a metric object. In typical embodiments, the metric service then passes a reference to the metric object to the metric vector service. In many embodiments, the metric vector service identifies, from a metric vector list, a metric vector ID identifying a user metric vector in dependence upon a user ID and a metric ID. In typical embodiments, if there is not yet a metric vector for the user ID and for that metric ID in the metric vector service's metric vector list, the metric vector service instantiates one and stores its metric vector ID in the metric vector services' metric vector table, indexed by the associated user ID and metric ID. Creating a user metric vector object can be implemented by way of the following exemplary pseudocode:

```
// receive a metric on input stream
// extract its userID as an integer
/ extract its metricID as an integer
// instantiate a metric object
Metric newMetric =
metricService.createMetricObject(userID,metricID,Value);
int MetricVectorID = 0;
if((MetricVectorID = MetricVectorList.get(userID,metricID)) == 0) {
    MetricVector newMetricVector =
    MetricVectorService.createMetricVectorObject(userID,metricID);
    MetricVectorID = newMetricVector.MetricVectorID;
    MetricVectorList.add(MetricVectorID, newMetricVector)
    }
```

In the pseudocode example above, the metric vector service searches a metric vector list by metric ID and user ID for a metric vector having references to the metric. If the metric vector list does not include the metric CreateMetricVectorObject( ) creates one having a new metric vector ID and MetricVectorList.add( ) adds the new metric vector to the metric vector list.

Continuing with another segment of pseudo code, the metric vector service then searches the metric vector list in dependence upon metric vector ID:

MetricVector userMetric Vector=MetricVectorList.get (MetricVectorID);
  userMetricVector.setMetric(Metric newMetric);

MetricVector.setMetric(Metric newMetric), in this example, operates by first checking whether it possesses in a metric list a reference to the new metric. If the new metric is not in its list, then setMetric( ) adds the new metric to its list. If the new metric is of a kind already represented in the list, then setMetric( ) replaces the previous reference with the new one, for example, like this:

```
setMetric(Metric newMetric) {
    if((Metric aMetric = metricList..get(newMetric.metricID)) == null){
        metricList.add(newMetric.metricID, newMetric)
    }
    else metricList.set(aMetric.metricID, newMetric);
}
```

The method of FIG. 6 includes creating (605) a user metric space (610) comprising a plurality of metric ranges. A user metric space (610) is comprised of a plurality of disparate metric ranges for a user. That is, a metric space is defined by a plurality of disparate metric ranges for a plurality of disparate metric IDs. In many exemplary embodiments of the present invention, a metric space is implemented as a metric space data structure such as the exemplary metric space (610) of FIG. 6. The metric space (610) of FIG. 6 includes a user ID identifying the user. The metric space (610) of FIG. 6 also includes data storage (655) for a list of references to disparate metric ranges for a user.

In the method of FIG. 6, creating (602) a user metric space (610) includes identifying (601) a plurality of metric ranges (210) for a plurality of disparate metrics (206) and associating (607) the plurality of disparate metric ranges (210) for the plurality of disparate metrics (206) with the user metric space (610). In many examples of the method of FIG. 6, identifying (601) a plurality of metric ranges (210) and associating (607) the plurality of metric ranges (210) the user metric space (610) is carried out by a metric space service that is instantiated by a DML. The metric vector service receives, from a user metric vector, a user metric vector ID and searches a metric space list identified by metric vector ID for a metric space and returns to the user metric vector a metric space ID identifying a metric space for comparison with the user metric vector. If there is no metric space for the metric vector ID, the metric space service instantiates one and stores the metric space ID in the metric space table. Creating a user metric space can be carried out by way of the following exemplary psuedocode:

```
// extract metric vector ID as an integer
// instantiate a metric space object
MetricVector newMetricVector =
    MetricVectorService.createMetricVectorObject(MetricVectorID);
int spaceID = 0;
if((spaceID = MetricSpaceList.get(metricVectorID)) == 0) {
MetricSpace newMetricSpace =
    MetricSpaceService.createMetricSpaceServiceObject(MetricVectorID);
MetricSpaceID = newMetricSpace. SpaceID;
MetricSpaceList.add(SpaceID, newMetricSpace)
    }
```

In the pseudo code example above, the metric vector service searches a metric space list indexed by metric vector ID. If the metric space list contains no metric space for the metric vector ID, then MetricSpaceService.createMetricSpaceServiceObject(metricVectorID) creates a new metric space with a new metric space ID.

In the following psuedocode segment, the metric vector service then searches the metric space list and retrieves a metric space:

MetricSpace userMetricSpace=MetricSpaceList.get(spaceID);
MetricSpace.setMetricRange(MetricRange newMetricRange);

MetricSpace.setMetricRange(MetricRange newMetricRange), in this example, operates by first checking whether it possesses in a metric space list a reference to for a metric range for each metric in the user metric vector. If a metric range is not in its list, then setMetricSpace( ) adds the metric range to its list. If the new metric range is of a kind already represented in the list, then setMetricRange( ) replaces the previous reference with the new one, for example, like this:

```
setMetricRange(MetricRange newRange) {
    if((MetricRange aMetricRange =
        metricRangeList..get(newMetricRange.metricID, userID)) == null){
        metricRangeList.add(newMetricRange.metricID.userID,
            newMetricRange)
    }
    else metricRangeList.set(aMetricRange.metricID.userID,
        newMetricRange);
}
```

The exemplary method of FIG. 6 includes determining (608) whether the user metric vector (606) is outside (309) a user metric space (610). In various alternative example embodiments determining (608) whether the user metric vector (606) is outside (309) a user metric space (610) is carried out using many different methods. Methods of determining whether the user metric vector (606) is outside (309) a user metric space (610) range in complexity from relatively simple comparison of user metrics with user ranges to much more complex algorithms. All methods of determining whether the user metric vector (606) is outside (309) a user metric space (610) are a part of the present invention. A few exemplary methods of determining (608) whether the user metric vector (606) is outside (309) a user metric space (610) are described in more detail below with reference to FIG. 8.

If the user metric vector (606) is outside (309) a user metric space (610), the exemplary method of FIG. 6 includes identifying (612) an action (315) in dependence upon the user metric vector. An action includes one or more computer programs, subroutines, or member methods that when executed, control one or more devices. Actions are typically implemented as object oriented classes and manipulated as objects or references to objects. In fact, in this specification, unless context indicates otherwise, the terms 'action,' 'action object,' and 'reference to an action object' are treated more or less as synonyms. In many embodiments of the method of FIG. 6, an action object calls member methods in a device class to affect current attributes of the physical device. In many embodiments of the method of FIG. 6, action classes or action objects are deployed in OSGi bundles to a DML on a services gateway.

In typical embodiments of the method of FIG. 6, identifying an action includes retrieving an action ID from an action list organized by user ID and metric vector ID. In the method of FIG. 6, retrieving an action ID from an action list includes retrieving from a list the identification of the action (the 'action ID') to be executed when a metric vector of a particular metric vector ID and for a particular user is outside of the user metric space. The action list can be implemented, for example, as a Java list container, as a table in random access memory, as a SQL database table with storage on a hard drive or CD ROM, and in other ways as will occur to those of skill in the art.

The exemplary method of FIG. 6 includes executing (614) the action (312). As mentioned above, the actions themselves comprise software, and so can be implemented as concrete action classes embodied, for example, in a Java package imported into the DML at compile time and therefore always available during DML run time. Executing an action therefore is often carried out in such embodiments by use of a switch( ) statement in the DML. Such a switch( ) statement can be operated in dependence upon the action ID and implemented, for example, as illustrated by the following segment of pseudocode:

```
switch (actionID) {
    Case 1: actionNumber1.take_action( ); break;
    Case 2: actionNumber2.take_action( ); break;
    Case 3: actionNumber3.take_action( ); break;
    Case 4: actionNumber4.take_action( ); break;
    Case 5: actionNumber5.take_action( ); break;
    // and so on
} // end switch( )
```

The exemplary switch statement selects a particular device controlling object for execution depending on the action ID. The device controlling objects administered by the switch( ) in this example are concrete action classes named actionNumber1, actionNumber2, and so on, each having an executable member method named 'take_action( ),' which carries out the actual work implemented by each action class.

Executing an action also is often carried out in such embodiments by use of a hash table in the DML. Such a hash table can store references to action object keyed by action ID, as shown in the following pseudocode example. This example begins by an action service's creating a hashtable of actions, references to objects of concrete action classes associated with a particular metric ID, using action IDs as keys. In many embodiments it is an action service that creates such a hashtable, fills it with references to action objects pertinent to a particular metric ID, and returns a reference to the hashtable to a calling metric object.

Hashtable ActionHashTable=new Hashtable( );
ActionHashTable.put("1", new Action1( ));
ActionHashTable.put("2", new Action2( ));
ActionHashTable.put("3", new Action3( ));

Executing a particular action then can be carried out according to the following pseudocode:

Action anAction=(Action) ActionHashTable.get("2");
if (anAction!=null) anAction.take_action( );

Many examples in this specification are described as implemented with lists, often with lists of actions, for example, returned with a reference to a list from an action service, for example. Lists often function in fashion similar to hashtables. Executing a particular action, for example, can be carried out according to the following pseudocode:

List ActionList=new List( );
ActionList.add(1, new Action1( ));
ActionList.add(2, new Action2( ));
ActionList.add(3, new Action3( ));

Executing a particular action then can be carried out according to the following pseudocode:

Action anAction=(Action) ActionList.get(2);
if (anAction!=null) anAction.take_action( );

The three examples just above use switch statements, hash tables, and list objects to explain executing actions according to embodiments of the present invention. The use of switch statements, hash tables, and list objects in these examples are for explanation, not for limitation. In fact, there are many ways of executing actions according to embodiments of the present invention, as will occur to those of skill in the art, and all such ways are well within the scope of the present invention.

Figure 7:
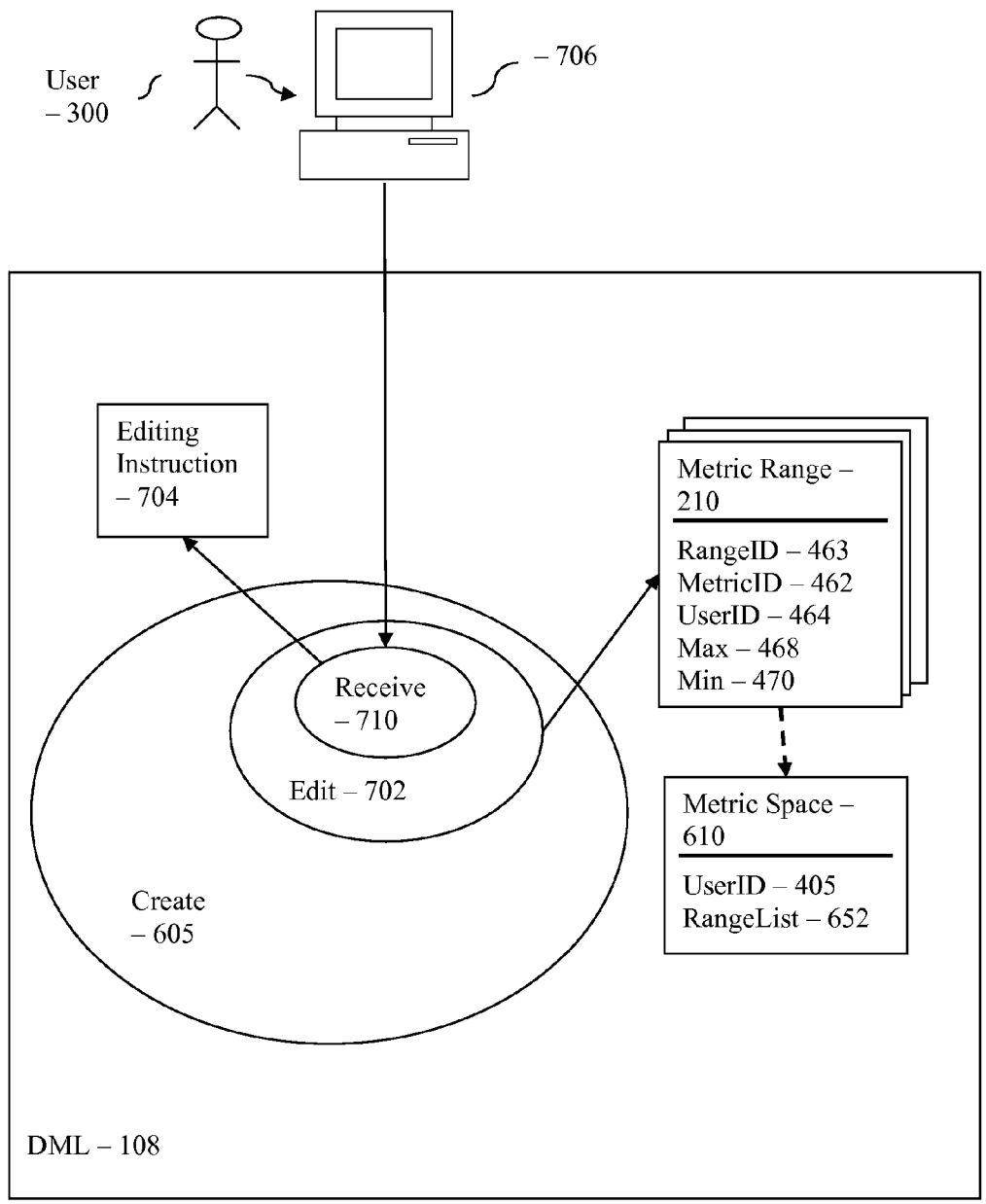
FIG. 7 is a data flow diagram illustrating an exemplary method of creating a user metric space.

We turn now to a more detailed discussion of creating a user metric space. FIG. 7 is a data flow diagram illustrating an exemplary method of creating (702) a user metric space (610). In the example of FIG. 7 creating (705) a user metric space (610) includes editing (702) a metric range. By editing a metric range of a metric space a user is empowered to expand or contract the user metric space by changing the minimum and maximum metric values of a particular metric range. Expanding a metric range, and therefore the user metric space, will, in many cases, result in less frequent determinations that a user metric vector is outside the user metric space, giving rise executing fewer actions administering devices. Contracting a metric range, and therefore a user metric space, in many cases, will result in more frequent determinations that the user metric vector is outside of the metric space, giving rise executing more actions administering devices. By editing the metric ranges, a user is empowered to affect the frequency with which a user metric vector is outside of the user metric space, and therefore, giving rise to more frequently executing actions that carry out the administration of devices.

In the method of FIG. 7, editing a metric range includes receiving (710) an editing instruction (704) from a user (300). In many example embodiments of the present invention, receiving an editing instruction (704) is carried out through the use of a web browser installed on a computer (706). In many embodiments, a services gateway on which a DML is installed has no user interface hardware, no terminal screen, no keyboard, no mouse, although such services gateways do often support HTTP interfaces to services on the gateway. In such embodiments, a user can access HTTP screens by logging on to a browser on a personal computer or other client device that does support user interface hardware and that is coupled to the services gateway through a LAN and directing the browser to the services gateway's IP address on the LAN. Using a web browser installed on a computer (706) connected to the services gateway on which a DML is installed, the user is empowered to change the maximum and minimum values of the metric ranges to expand or contract the user metric space.

Figure 8:
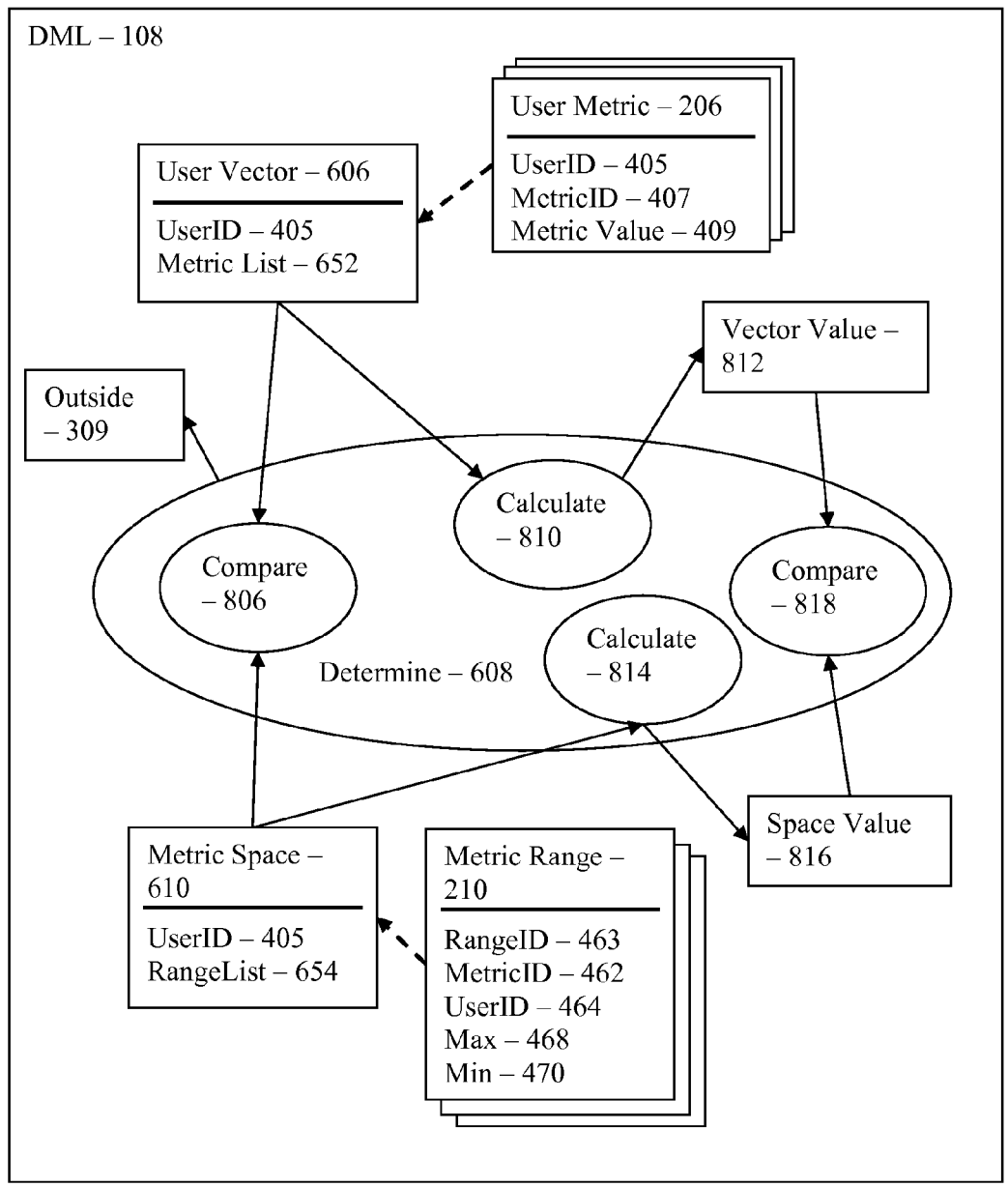
FIG. 8 is a data flow diagram illustrating an exemplary method of determining whether a user metric vector is outside a user metric space.

FIG. 8 is a data flow diagram illustrating two exemplary methods of determining (608) whether the user metric vector (606) is outside (309) a user metric space (610). The first illustrated method of determining (608) whether the user metric vector (606) is outside (309) a user metric space (610) includes comparing (806) the metric values (409) of the user metric vector (606) with the metric ranges (210) of the metric space. In some examples of the present invention, comparing a metric value of a user metric vector with its corresponding metric range includes measuring a degree to which the value of a user metric is outside a predefined metric range and identifying if the value of the user metric is above the predefined metric range or below the predefined metric range.

In many exemplary embodiments of the present invention, determining whether the user metric vector is outside of the metric space is a function of multiple individual comparisons between metric values and metric ranges. In various alternative embodiments of the present invention, different criteria are used to identify the number of metric values that must be outside of their corresponding metric ranges, or the degree to which any metric value is outside of its corresponding metric range to determine that the user metric vector is outside of the metric space. In some embodiments using a strict criteria for determining if a user metric vector is outside of a user metric space, if only one metric value is outside of its corresponding metric range, then the user metric vector is determined to be outside of the metric space. In other embodiments, using less strict criteria for determining if a user metric vector is outside of a user metric space, a user metric vector is determined to be outside the user metric space if all of the metric values of the user metric vector are outside of their corresponding metric ranges by a certain degree. In various embodiments, the number of metric values that must be outside of their corresponding metric ranges, or the degree to which a metric must be outside of its corresponding metric range to make a determination that the user metric vector is outside of the metric space will vary, all such methods of determining whether a user metric vector is outside of a metric space are included in the present invention.

The second illustrated method determining (608) that the user metric vector (606) is outside the user metric space (610) illustrated in FIG. 8 includes calculating (810) a metric vector value (812) and calculating (814) a metric space value (815) and comparing (818) the metric vector value (812) and the metric space value (816). One way of calculating a metric vector value is by using a predetermined formula to identify a single value that is a function of the metric values of the user metric vector. In one exemplary embodiment of the present invention, calculating a metric vector value includes averaging the metric values of the user metric vector. In another example embodiment, calculating a metric vector value includes prioritizing certain kinds of metrics and using a weighted average based on the priority of the metric to calculate a metric vector value.

In some exemplary embodiments, calculating (814) a metric space value (815) includes using a predetermined formula to determine a metric space value that is a function of the minimum and maximum values of each range. In one example embodiment, calculating a metric space value includes finding the center point of the minimum and maximum value of the each metric range and then averaging the center points.

The illustrated method includes comparing (818) the metric space value (815) and the metric vector value (812). In various embodiments of the present invention, how the metric vector value and the metric space value are compared to determine whether the metric vector is outside of the metric space will vary. In one example embodiment, the metric vector value is subtracted from the metric space value. If the result of the subtraction is within a predetermined range, then the user metric vector is determined to be within the metric space. In the same example, if the result of the subtraction is not within the predetermined range, then the metric vector value is not determined to be within the metric space.

The illustrated methods of FIG. 8 are provided for explanation and not for limitation. There are many other ways metric ranges and metric values can be compared, combined, manipulated, or otherwise used to make a determination that a user metric vector is outside of a metric space. All such ways of comparing, combining, manipulating, or otherwise using metric values and metric ranges to make a determination that a user metric vector is outside of a metric space are part of the present invention.

Administering Devices with Multiple Metric Spaces for a User

Figure 9:
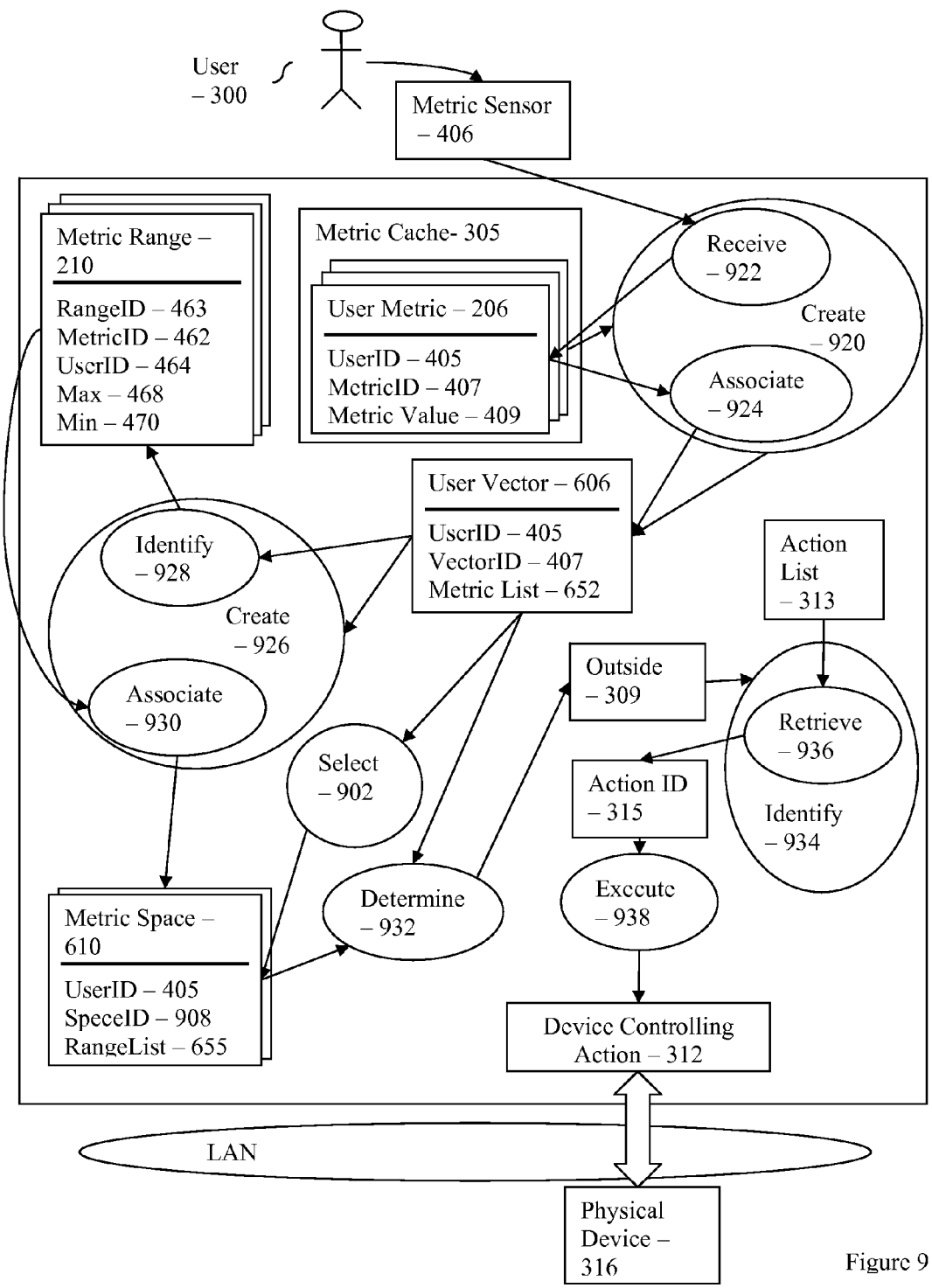
FIG. 9 is a data flow diagram illustrating an exemplary method of administering devices in accordance with the present invention.

The previous section of this disclosure introduced user metric vectors and user metric spaces. We now turn to address methods for administering devices including multiple metric spaces for a user. FIG. 9 is a data flow diagram illustrating an exemplary method for administering devices. The method of FIG. 9 includes creating (920) a user metric vector (606) comprising a plurality of disparate user metrics (206). As described above with reference to FIG. 6, a user metric vector (606) is a complex indication of user condition comprised of a plurality of disparate user metrics, each user metric representing a single quantifiable aspect of a user's condition and a quantity measuring the aspect.

In typical embodiments of the present invention, a user metric vector is implemented as a user metric vector data structure or record (606), such as the exemplary user metric vector (606) of FIG. 9. The user metric vector (606) includes a user ID (405) identifying the user and a metric vector ID (407) identifying the metric vector. The user metric vector (606) also includes data storage for a metric list (652) including references to current disparate user metrics stored as a metric list (652).

In the method of FIG. 9, creating (920) a user metric vector (606) includes receiving (922) a plurality of disparate user metrics (206) having a plurality of metric values (409) and a plurality of disparate metric IDs (407). In many typical embodiments of the method of FIG. 9, receiving (922) a plurality of disparate user metrics (206) includes receiving disparate user metrics from one or more metric sensors (406). In some examples of the method of FIG. 9, the metric sensor (300) reads an indication of a user's condition, creates a user metric in dependence upon the indication of a user's condition, and transmits the user metric to a DML. In many typical embodiments, the metric sensor transmits the user metric to the DML in a predefined data structure, such as the metric (206) of FIG. 3, to the DML using, for example, protocols such as Bluetooth, 802.11, HTTP, WAP, or any other protocol that will occur to those of skill in the art.

In the method of FIG. 9, creating (920) a user metric vector (606) include associating (924) the plurality of disparate user metrics (206) with the user metric vector (606). 'Associated,' generally in this disclosure and subject to context, means associated by reference. That is, saying that an object of one class is associated with another object means that the second object possesses a reference to the first. The objects can be mutually associated, each possessing a reference to the other. Other relations among objects, aggregation, composition, and so on, are usually types of association, and the use of any of them, as well as others as will occur to those of skill in the art, is well within the scope of the present invention. In the exemplary method of FIG. 9, associating (924) the plurality of disparate user metrics (206) with the user metric vector (606) is carried out by providing references to a plurality of disparate metric objects in the user metric vector (606)

The method FIG. 9 includes creating (926) a plurality of user metric spaces (610), each user metric space (610) comprising a plurality of metric ranges. As described above with reference to FIG. 6, a user metric space (610) is comprised of a plurality of disparate metric ranges for a user. That is, a metric space is defined by a plurality of disparate metric ranges for a plurality of disparate metric IDs.

Multiple metrics spaces provide environmental context to methods of administering devices by providing a metric space for a user that is appropriate for the user's current physical or emotional environment. The term 'environment' in this disclosure is not limited to a physical environment surrounding the user. Environments also include a user's emotional context such as stress, joy, excitement, and so on. Physical and emotional environments often affect user condition, and therefore, often affect user metrics. For example, user metrics received when a user is sitting in traffic on a large freeway are in many cases different than user metrics received when a user is sitting at home watching television. Using an environmentally appropriate metric space in methods for administering devices allows increased granularity with regard to determining that a user is outside the user metric space, thereby, giving rise to executing actions to administer devices. While objectively identifying a user's emotional condition may seem more difficult than objectively identifying certain physical conditions surrounding the user, methods according to the present invention, do in fact address selecting an appropriate metric space for a user's in dependence upon a user's emotional environment as will be discussed below.

In many exemplary embodiments of the present invention, a metric space is implemented as a metric space data structure such as the exemplary metric space (610) of FIG. 6. The metric space (610) of FIG. 6 includes a user ID identifying the user and a space ID (908) identifying the metric space. The metric space (610) of FIG. 6 also includes data storage (655) for a list of references to disparate metric ranges for a user.

In the method of FIG. 9, creating (922) a plurality of user metric spaces (610) includes identifying (928) a plurality of metric ranges (210) for a plurality of disparate metrics (206) and associating (930) the plurality of disparate metric ranges (210) for the plurality of disparate metrics (206) with the user metric spaces (610). As described above in more detail with reference to FIG. 6, in many examples of the method of FIG. 9, identifying (928) a plurality of metric ranges (210) and associating (930) the plurality of metric ranges (210) the user metric space (610) is carried out by a metric space service. In many embodiments, the metric space service receives a metric vector ID from a metric vector object and searches, in dependence upon the metric vector ID, a metric space table for a metric space and returns to the user metric vector a metric space ID identifying a metrics space for comparison with the user metric vector. If there is no metric space for the metric vector ID, the metric space service instantiates one and stores the metric space ID in the metric space table.

The method of FIG. 9 includes selecting (902), from the plurality of user metric spaces, a metric space (610) for a user. In many example embodiments of the present invention, selecting a metric space for the user includes selecting an environmentally appropriate metric space for a user. Often such embodiments include identifying a metric space ID and retrieving a metric space from a metric space table, in dependence upon the space ID. Some exemplary methods of selecting a user metric space in accordance with the present invention are described in more detail below with reference to FIG. 10.

The method of FIG. 9 includes determining (932) whether the user metric vector (606) is outside (309) the selected metric space (610). As described in more detail above with reference to FIG. 8, in many example embodiments, determining (932) whether the user metric vector (606) is outside (309) the selected user metric space (610) is carried out using many different methods ranging from a relatively simple comparison to much more complicated algorithms all of which are included in the present invention.

If the user metric vector (606) is outside (309) the selected metric space (610), the method of FIG. 9 includes identifying (934) an action (315) in dependence upon the user metric vector. An action includes one or more computer programs, subroutines, or member methods that when executed, control one or more devices. Actions are typically implemented as object oriented classes and manipulated as objects or references to objects. In many embodiments of the method of FIG. 9, an action object calls member methods in a device class to affect current attributes of the physical device. In many embodiments of the method of FIG. 9, action classes or action objects are deployed in OSGi bundles to a DML on a services gateway.

In typical embodiments of the method of FIG. 9, identifying an action includes retrieving an action ID from an action list organized by user ID and metric vector ID. In the method of FIG. 9, retrieving an action ID from an action list includes retrieving from a list the identification of the action (the 'action ID') to be executed when a metric vector of a particular metric vector ID and for a particular user is outside of the user metric space. The action list can be implemented, for example, as a Java list container, as a table in random access memory, as a SQL database table with storage on a hard drive or CD ROM, and in other ways as will occur to those of skill in the art.

The method of FIG. 9 includes executing (934) the action (312). As mentioned above, the actions themselves comprise software, and so can be implemented as concrete action classes embodied, for example, in a Java package imported into the DML at compile time and therefore always available during DML run time. As described in more detail above with reference to FIG. 6, exemplary methods of executing actions include using switch statements, hash tables, list objects or any other method of executing an action that will occur to those of skill in the art.

Figure 10:
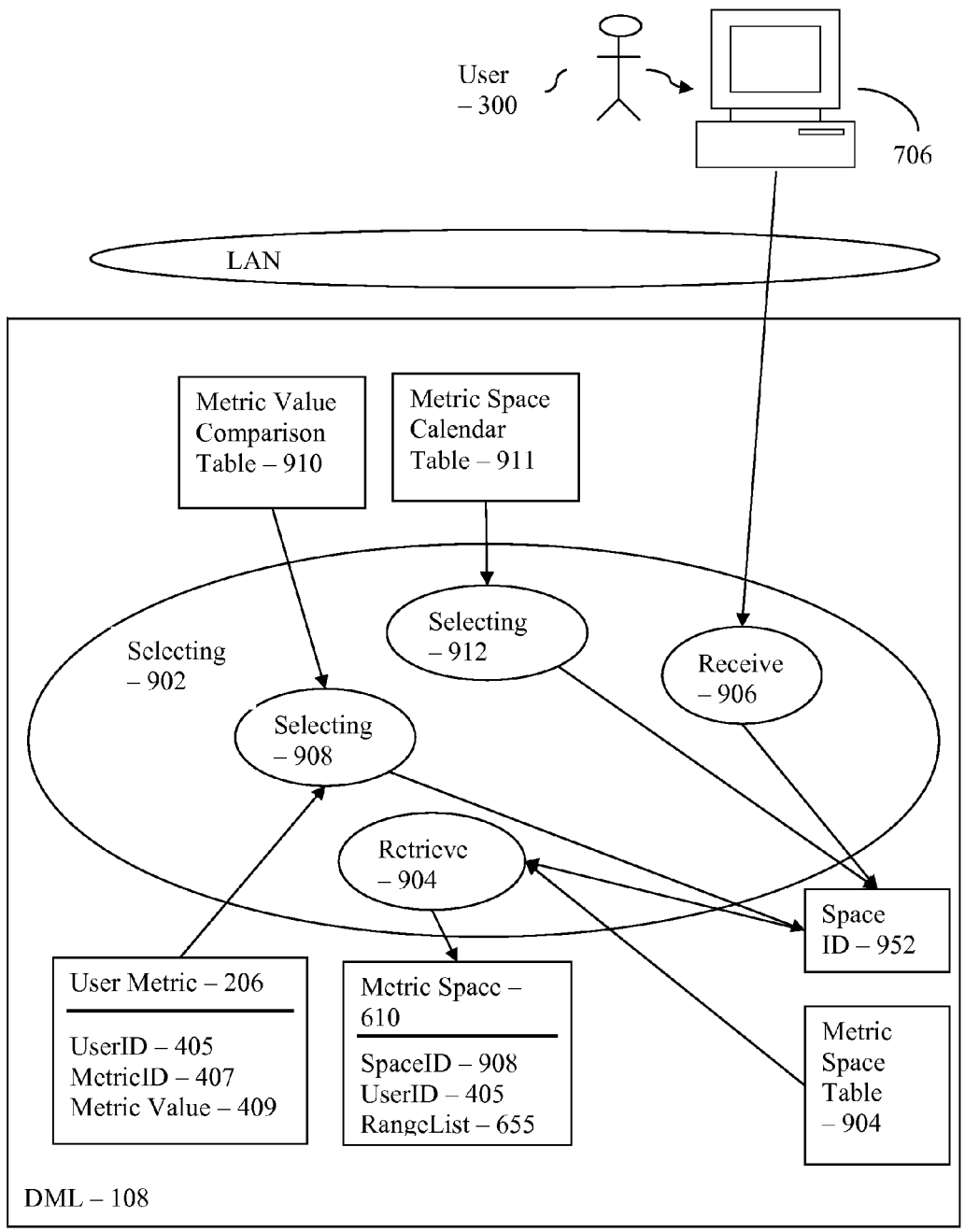
FIG. 10 is a data flow diagram illustrating an exemplary method of selecting a user metric space.

FIG. 10 is a data flow diagram illustrating exemplary alternative methods of selecting (902), from a multiplicity of user metric spaces, a user metric space (610). In one of the illustrated methods of FIG. 10, selecting (902), from a plurality of user metric spaces, a user metric space (610) for a user receiving (906) a metric space ID (952) from a user (300). By receiving a metric space ID from a user, a user is empowered to select an environmentally appropriate metric space. Because the user is selecting the metric space, the user can select a metric space that is not only appropriate for the user's physical surroundings, but is also appropriate for the user's emotional environment. A user, knowing his own emotional environment, is empowered to select an appropriate metric space. Selecting a metric space having larger metric ranges will, in many cases, result in less frequent determinations that a user metric vector is outside the selected user metric space, and executing fewer actions administering devices. Selecting a metric space having smaller metric ranges, in many cases, will result in more frequent determinations that the user metric vector is outside of the metric space, and executing more actions administering devices.

Receiving a metric space ID from a user, in some embodiments, carried out through the use of a web browser installed on a computer (706). In many embodiments, a services gateway on which the DML is installed has no user interface hardware, no terminal screen, no keyboard, no mouse, although such services gateways do often support HTTP interfaces to services on the gateway. In such embodiments, a user can access HTTP screens by logging on to a browser on a personal computer or other client device that does support user interface hardware and that is coupled to the gateway through a LAN and directing the browser to the services gateway's IP address on the LAN. Using a web browser installed on a computer (706) connected to the services gateway, a user may access instruction screens displaying a plurality of user metric spaces and providing choices for the user to select a metric space. The user is empowered to select an appropriate metric space.

In other exemplary embodiments, selecting a metric space is carried out without user intervention. In another of the illustrated methods of FIG. 10, selecting (902), from a multiplicity of metric spaces, a metric space (610) for a user comprises selecting (908) a metric space ID (952) in dependence upon the value (409) of a user metric (206). In many cases an environmentally appropriate metric space can be selected in dependence upon the value of a single metric in the user metric vector. For example, an appropriate metric space for a user located at home may not be appropriate for the same user located in the user's boss's office. The metric space that is selected when GPS metrics indicate that the user is located in the user's boss's office may include different metric ranges than the metric space selected when GPS metrics indicate that the user is in the user's office.

In many exemplary embodiments, selecting a metric space is carried out by a metric space service without user intervention. In some examples of the illustrated method, selecting (908) a metric space ID (952) in dependence upon the value (409) of a user metric (206) includes comparing the value of the user metric with a metric value comparison table, including, for example, a user ID, a metric vector ID, metric ID, metric value, and a space ID. A metric service compares the metric values of the user metric vector with the metric value comparison table (910) and selects a space ID, in dependence upon the metric value.

Calendar data, such as day, month, year, and time of day are also criteria for selecting an appropriate metric space, without requiring user intervention. For example, an appropriate user metric space on Christmas may contain different metric ranges than an appropriate user metric space on a day the user is giving a presentation to the user's boss. Similarly, an appropriate user metric space at 2:00 AM may contain different metric ranges than an appropriate user metric space at 2:00 PM.

In another illustrated method of FIG. 10, therefore, selecting (902), from a plurality of user metric spaces, a user metric space (610) includes selecting (912) a metric space ID in dependence upon a calendar data (916). In many example embodiments, a metric service includes a metric space calendar table including space IDs indexed by calendar data such as day and time. The metric service, in some embodiments, therefore selects a metric space ID in dependence upon day and time.

In some embodiments, a user can associate a day a time with a particular metric space. For example, a user may associate a metric space having larger metric ranges for the user with a day and time of an important business meeting. In some embodiments of the present invention, a user may associate a metric space with calendar data using for example, a web browser installed on a computer (706). In such embodiments, a user can access HTTP instruction screens allowing a user to associate a particular metric space with calendar data, such as a day and time.

Once a metric space ID identifying a metric space is selected, in many exemplary embodiments, selecting (902), from a multiplicity of user metric spaces, a user metric space (610) also includes retrieving (904) a metric space from a metric space table in dependence upon a metric space ID (904). In many example embodiments, a metric space service includes a metric space table including references to various user metric spaces indexed by space ID. In many such embodiments, when the metric service selects a space ID identifying an appropriate metric space, the metric service searches the metric space table for a reference to the metric space object identified by the space ID and passes a reference to the metric space object to a metric vector object for comparison to determine whether the user metric vector is outside the metric space.

Exemplary Classes and Class Cooperation

FIG. 11 is a block diagram illustrating exemplary classes useful in implementing methods for administering devices in accordance with the present invention. The exemplary classes of FIG. 11 are presented as an aid to understanding of the present invention, not for limitation. While methods of administering devices in accordance with the present invention are discussed generally in this specification in terms of Java, Java is used only for explanation, not for limitation. In fact, methods of administering devices in accordance with the present invention can be implemented in many programming languages including C++, Smalltalk, C, Pascal, Basic, COBOL, Fortran, and so on, as will occur to those of skill in the art.

The class diagram of FIG. 11 includes an exemplary DML class (202). An instance of the exemplary DML class (202) of FIG. 11 provides member methods that carry out the steps of administering devices in accordance with the present invention. The exemplary DML class of FIG. 11 is shown with an Activator.start( ) method so that the DML can be started as a service in an OSGi framework. Although only one member method is shown for this DML, DMLs in fact will often have more member methods as needed for a particular embodiment. The DML class of FIG. 11 also includes member data elements for storing references to services classes, often created by the DML's constructor. In this example, the DML provides storage fields for references to a metric service (552), a metric range service (558), a communication service (554), an action service (560), a device service (556), a metric vector service (559) and a metric space service (561).

The metric service class (204) of FIG. 11 provides member methods that receive user metrics from a DML and create, in response to receiving the user metrics from the DML, an instance of a metric class. The metric service class (204) of FIG. 11 includes a createMetric(UserID, MetricID, MetricValue) member method (562). The createMetric( ) member method is a factory method parameterized with a metric ID that creates and returns a metric object in dependence upon the metric ID. In response to getting a user metric from the DML, the exemplary instance of the metric service class (204) of FIG. 11 creates an instance of a metric class and returns to the DML a reference to the new metric object.

Strictly speaking, there is nothing in the limitations of the present invention that requires the DML to create metric object through a factory method. The DML can for example proceed as illustrated in the following pseudocode segment:

```
// receive on an input stream a metric message
// extract from the metric message a userID,
// a metric ID, and a metric value, so that:
int userID = // userID from the metric message
int metricID = // metricID from the metric message
int metricValue = // metric value from the metric message
Metric aMetric = new Metric( );
aMetric.setUserID (userID);
aMetric.setMetricID(metricID);
aMetric.setMetricValue(metricValue);
aMetric.start ( );
```

This example creates a metric object and uses accessor methods to load its member data. This approach provides exactly the same class of metric object for each metric, however, and there are circumstances when metrics advantageously utilize different concrete class structures. In the case of metrics for heart rate and blood pressure, for example, both metric values may be encoded as integers, where a metric value for polar coordinates on the surface of the earth from a GPS transceiver, for example, may advantageously be encoded in a more complex data structure, even having its own Location class, for example. Using a factory method eases the use of more than one metric class. A DML using a factory method to create metric objects can proceed as illustrated in the following exemplary pseudocode segment:

```
// receive on an input stream a metric message
// extract from the metric message a userID,
// a metric ID, and a metric value, so that:
int userID = // userID from the metric message
int metricID = // metricID from the metric message
int metricValue = // metric value from the metric message
Metric aMetric = MetricService.createMetricObject(userID, metricID,
    metricValue);
aMetric.start( );
```

This example relies on the factory method createMetric( ) to set the parameter values into the new metric object. A metric service and a factory method for metric object can be implemented as illustrated in the following pseudocode segment:

```
//
// Metric Service Class
//
class MetricService
{
    public static Metric createMetricObject(userID, metricID,
    metricValue)
    {
        Metric aMetric;
        switch(metricID)
        {
            case 1: aMetric = new HeartRateMetric(userID,
                metricID, metricValue);
                break;
            case 2: aMetric =
                new BloodPressureMetric(userID, metricID,
                metricValue);
                break;
            case 3: aMetric = new GPSMetric(userID,
                metricID metricValue);
                break;
        } // end switch( )
        return aMetric;
    } // end createMetric( )
} // end class MetricService
```

MetricService in this example implements a so-called parameterized factory design pattern, including a factory method. In this example, the factory method is a member method named 'createMetricObject( ).' CreateMetric Object( ) accepts three parameters, a user ID, a metric ID, and a metric value. CreateMetricObject( ) implements a switch statement in dependence upon the metric ID to select and instantiate a particular concrete metric class. The concrete metric classes in this example are HeartRateMetric, BloodPressureMetric, and GPSMetric, each of which extends a Metric base class. CreateMetricObject( ) returns to the calling DML a reference to a new metric object. The call from the DML:

Metric aMetric=MetricService.createMetricObject(userID, metricID, metricvalue);

is polymorphic, utilizing a reference to the base class Metric, so that the calling DML neither knows nor cares which class of metric object is actually instantiated and returned. The following is an example of extending a Metric base class to define a concrete metric class representing a user's location on the surface of the earth extending a Metric base class:

```
Class GPSMetric extends Metric {
    int myUserID;
    int myMetricID
    class GPSLocation {
        Latitude myLatitude;
        Longitude myLongitude;
    }
    Class Latitude {
        String direction;
        int degrees;
        int minutes;
        int seconds;
    }
    Class Longitude {
        String direction;
        int degrees;
        int minutes;
        int seconds;
    }
    GPSLocation myLocation;
    GPSMetric(int userID, int metricID GPSLocation metricValue) {
        myUserID = userID;
        myMetricID = metricID:
        myLocation = metricValue;
    }
}
```

The example concrete class GPSMetric provides storage for latitude and longitude. GPSMetric provides a constructor GPSMetric( ) that takes integer arguments to set userID and metricID but expects its metricValue argument to be a reference to a GPSLocation object, which in turn provides member data storage for latitude and longitude.

The class diagram of FIG. 11 includes an exemplary metric class (206). The exemplary metric class (206) of FIG. 11 represents a user metric. The exemplary metric class (206) of FIG. 11 includes a user ID field (486), a metric ID field (488), a value field (490). The user ID field (486) identifies the user. The metric ID (488) field identifies the user metric that an instance of the metric class represents. The value field (490) includes a value of the user metric. This exemplary metric class (206) is an example of a class that can in various embodiments be used in various embodiments as a generic class, instances of which can be used to store or represent more than one type of metric having identical or similar member data elements as discussed above. Alternatively in other embodiments, a class such as this example metric class (206) can be used as a base class to be extended by concrete derived classes each of which can have widely disparate member data type, also described above.

The class diagram of FIG. 11 includes a metric vector service (207). The metric vector service class (207) of FIG. 11 provides member methods that receive user metrics from a metric service and create, in response to receiving the user metrics from the metric service, an instance of a metric vector class. The metric vector service class (207) includes a createMetric vectorObject( ) member method (565). In many example embodiments, the createMetric vectorObject( ) member method identifies from a metric vector list a metric vector ID for the user metric vector in dependence upon the user ID, and the metric ID. If there is not a metric vector for the user and for that metric ID in the metric vector service's metric vector list, the metric vector service instantiates one and stores its metric vector ID in a metric vector table, indexed by the associated user ID and metric ID. Creating a metric vector object can be implemented as illustrated in the following pseudocode segment:

```
// receive a metric on input stream
// extract its userID as an integer
// instantiate a metric object
Metric newMetric = metricService.createMetricObject(metricID);
int MetricVectorID = 0;
if((MetricVectorID = MetricVectorList.get(userID, metricID)) == 0) {
    MetricVector newMetricVector =
    MetricVectorService.createMetricVectorObject(userID, metricID);
    MetricVectorID = newMetricVector.MetricVectorID;
    MetricVectorList.add(MetricVectorID, newMetricVector)
}
```

In the pseudocode example above, if the metric vector service receives a metric having a userID for which it has no metric vector identified in the metric vector service's metric vector table, the metric vector service creates a new metric vector having a new metric vector ID for the user.

In the following pseudo code example, the metric vector services then gets metric vector in dependence upon the metric vector ID and uses setMetric to replace the existing metric or if the same kind of metric does not exist in the metric vector object, add one.

MetricVector userMetricVector=MetricVectorList.get (MetricVectorID);
userMetricVector.setMetric(Metric newMetric);
MetricVector.setMetric(Metric newMetric), in this example, operates by first checking whether it possesses in a metric list a reference to the new metric. If the new metric is not in its list, then setMetric( ) adds the new metric to its list. If the new metric is of a kind already represented in the list, then setMetric( ) replaces the previous reference with the new one, for example, like this:

```
setMetric(Metric newMetric) {
    if((Metric aMetric = metricList..get(newMetric.metricID)) == null){
        metricList.add(newMetric.metricID, newMetric)
    }
    else metricList.set(aMetric.metricID, newMetric);
}
```

The class diagram of FIG. 11 includes a metric vector class (606). Objects of the metric vector class represent a complex indication of user condition. The metric vector class (606) includes data elements for storing a user ID (486) identifying the user and a metric list (652) for storing references to the metric objects. The exemplary metric vector class of FIG. 11 includes data elements for storing an action list (492) and a metric range (494). The metric vector class includes member methods for determining if the metric vector is outside of the user metric space. The actionList field (492) contains a reference to a list of action objects. The action list is a list of actions to be executed if the metric vector is determined to be outside of the metric space. This exemplary metric vector class is an example of a class that can in various embodiments be used as a generic class, instances of which can be used to store or represent more than one type of vector having identical or similar member data elements as discussed above. Alternatively in other embodiments, a class such as this example metric vector class can be used as a base class to be extended by concrete derived classes each of which can have disparate member data types.

The class diagram of FIG. 11 includes metric range service class (208). The metric range service class (208) provides member methods that instantiate an instance of a metric range class. The metric range service class (208) of FIG. 11 includes a createRangeObject(UserID, MetricID) member method (572). The createRangeObject( ) member method is a factory method parameterized with a userID and a metric ID that creates a metric range object in dependence upon the userID and metric ID. The createRangeObject( ) factory method returns a reference to the metric range object to the metric object. The createRangeObject( ) is a parameterized factory method that can be implemented using the same design patterns outlined by the exemplary psuedocode provided in the description of the createMetricObject( ) factory method.

The class diagram of FIG. 11 includes an exemplary metric range class (210). An instance of the exemplary metric range class represents a predefined metric range for a user for a metric. A maximum value and minimum value in a metric range object are compared with a metric value to determine whether the metric value of the metric object is outside of a predefined metric range. The exemplary metric range class (210) of FIG. 11 includes range ID field (463) identifying the metric range, and a metric ID field (462) identifying the user metric. The exemplary metric range class (210) of FIG. 11 includes a user ID field (464) identifying the user. The metric range class also includes a Max field (468) and a Min field (470) containing a maximum value and a minimum value defining a metric range. The exemplary metric range class (210) of FIG. 11 is an example of a so-called data object, that is, a class that serves only as a container for data, with little or no processing done on that data by the member methods of the class. In this example, objects of the metric range class are used primarily to transfer among other objects the minimum and maximum values of a metric range. The metric range class of FIG. 11 includes a default constructor (not shown), but strictly speaking, would need no other member methods. If the metric range class were provided with no other member methods, cooperating object could access its member data elements directly by coding, such as, for example: "someMetricRange.max" or "someMetricRange.min." The particular example in this case (210), however, is illustrated as containing accessor methods (471, 473) for the minimum and maximum values of its range, a practice not required by the invention, but consistent with programming in the object oriented paradigm.

The class diagram of FIG. 11 includes a metric space service class (209). The metric space service class (209) includes a member method createMetricSpace( ) that searches a metric space table to identify a metric space for a user. If no such metric space exists, createMetricSpace( ) instantiates one and stores the metric space ID in the metric space table. Creating a metric space object can be implemented by way of the following exemplary psuedocode:

```
// extract its userID and MetricVector ID as an integer
// instantiate a metric space object
MetricVector newMetricVector
    =MetricVectorService.createMetricVectorObject(userID,
    MetricVectorID);
int spaceID = 0;
if((spaceID = MetricSpaceList.get(userID,metric vectorID)) == 0) {
MetricSpace newMetricSpace =
    MetricSpaceService.createMetricSpace(userID, MetricVectorID);
MetricSpaceID = newMetricSpace.SpaceID;
MetricSpaceList.add(SpaceID, newMetricSpace)
    }
```

In the pseudo code example above, the metric space service searches a metric space list for a metric space. If the list contains no metric space for the userID and metric vector ID, then MetricSpaceService.createMetricSpace(userID, MetricVectorID) creates a new metric space with a new metric space ID.

In the next exemplary segment of pseudocode, the metric space service sets the metric ranges of the metric space.
MetricSpace userMetricSpace=MetricSpaceList.get(spaceID);
MetricSpace.setMetricRange(MetricRange newMetricRange);
MetricSpace.setMetricRange(MetricRange newMetricRange), in this example, operates by first checking whether it possesses in a metric space list a reference to for a metric range for each metric in the user metric vector. If a metric range is not in its list, then setMetricSpace( ) adds the metric range to its list. If the new metric range is for a metric ID already represented in the list, then setMetric( ) replaces the previous reference with the new one, for example, like this:

```
setMetricRange(MetricRange newRange) {
    if((MetricRange aMetricRange =
    metricRangeList..get(newMetricRange.metricID, userID)) == null){
        metricRangeList.add(newMetricRange.metricID.userID,
        newMetricRange)
    }
    else metricRangeList.set(aMetricRange.metricID.userID,
    newMetricRange);
}
```

The class diagram of FIG. 11 includes a metric space class. The user metric space is comprised of a plurality of user metric ranges for disparate metrics. The exemplary metric space includes data elements for storing a user ID (405) identifying the user and a space ID (908) identifying the metric space. The metric space (610) of FIG. 11 also includes data storage (655) for a list of references to disparate metric ranges for a user.

The class diagram of FIG. 11 an action service class (217). The action service class includes member methods that instantiate an action list for a metric, instantiate action objects for a metric for a user, store references to the action objects in the action list, and return to a calling metric a reference to the action list, all of which can be implemented as illustrated by the following exemplary pseudocode ActionService class:

```
//
//  Action Service Class
//
class ActionService
{
    public static Action createActionList(userID, MetricVectorID)
    {
        ActionList anActionList = new ActionList( );
        int actionID;
        // with finds of database action records storing
        data describing actions
        for(/* each action record matching userID and metric
        vectorID */) {
            // obtain action ID from each matching action record
            actionID = // action ID from matching database record
            // reminder: the action constructors below obtain
            from a device
            // service a list of devices administered by the action
            object switch(actionID)
            {
                case 1: Action anAction1 = new
                Action1(DeviceService, actionID);
                    anActionList.add(anAction1);
                    break;
```

```
                case 2: Action anAction2 = new
                    Action2(DeviceService, actionID);
                        anActionList.add(anAction2);
                        break;
                case 3: Action anAction3 = new
                    Action3(DeviceService, actionID);
                        anActionList.add(anAction3);
                        break;
                case 4: Action anAction4 = new
                    Action4(DeviceService, actionID);
                        anActionList.add(anAction4);
                        break;
                case 5: Action anAction5 = new
                    Action5(DeviceService, actionID);
                        anActionList.add(anAction5);
                        break;
            } // end switch( )
        } // end for( )
        return anActionList;
    } // end createActionListObject( )
} // end class ActionService
```

The createActionList( ) method in ActionService class instantiates an action list for a user metric vector with "ActionList anActionList=new ActionList( )." CreateAction-List( ) then searches an action record table in a database for records having user IDs and metric vector IDs matching its call parameters. For each matching record in the table, createActionList( ) instantiates an action object through its switch statement. The switch statement selects a particular concrete derived action class for each action ID retrieved from the action record table. CreateActionList( ) stores a references to each action object in the action list with "anActionList.add( )." CreateActionList( ) returns a reference to the action list with "return anActionList."

The class diagram of FIG. 11 includes an exemplary action class (216). An instance of the action class represents an action that is executed in dependence upon a determination that an instance of the user metric vector class (606) is outside of an instance of the metric space class (610). The exemplary action class of FIG. 11 includes an action ID field (450). The do_action( ) method (456) in the exemplary action class (216) is programmed to obtain a device list (458) from, for example, a call to DeviceService.createDeviceList( ). Action.do_action( ) (456) typically then also is programmed to call interface methods in each device in its device list to carry out the action that the action class is designed to carry out.

The class diagram of FIG. 11 includes a device service class (218). The device service class provides a factory method named createDeviceList(actionID) that creates a list of devices and returns a reference to the list. In this example, createDeviceList( ) operates in a fashion similar to ActionService.createActionList( ) described above, by instanting a device list, searching through a device table for device IDs from device records having matching action ID entries, instantiating a device object of a concrete derived device class for each, adding to the device list a reference to each new device object, and returning to a calling action object a reference to the device list. In this example, however, the factory method createDeviceList( ) not only retrieves a device ID from its supporting data table, but also retrieves a network address or communications location for the physical device to be controlled by each device object instantiated, as illustrated by the following exemplary pseudocode:

```
//
//   Device Service Class
//
class DeviceService
{
    public static Device createDeviceList(actionID)
    {
        DeviceList aDeviceList = new DeviceList( );
        int deviceID;
        // with finds of database device records storing data
        describing devices
        for(/* each device record matching actionID */) {
            // obtain device ID and device address from each
            matching device record
            deviceID = // device ID from matching database record
            deviceAddress = // device ID from matching database record
            // reminder: the device constructors below obtain
            from a device
            // service a list of devices administered by the device object
            switch(deviceID)
            {
                case 1: Device aDevice = new Device1(CommsService,
                    deviceAddress, deviceID);
                    break;
                case 2: Device aDevice = new Device2(CommsService
                    deviceAddress, deviceID);
                    break;
                case 3: Device aDevice = new Device3(CommsService
                    deviceAddress, deviceID);
                    break;
                case 4: Device aDevice = new Device4(CommsService
                    deviceAddress, deviceID);
                    break;
                case 5: Device aDevice = new Device5(CommsService
                    deviceAddress, deviceID);
                    break;
            } // end switch( )
            aDeviceList.add(aDevice);
        } // end for( )
        return aDeviceList;
    } // end createDeviceListObject( )
} // end class DeviceService
```

The createDeviceList( ) method in DeviceService class instantiates a device list for a metric with "DeviceList aDeviceList=new DeviceList( )." CreateDeviceList( ) then searches a device record table in a database for records having action IDs matching its call parameter. For each matching record in the table, createDeviceList( ) instantiates a device object through its switch statement, passing three parameters, CommsService, deviceAddress, and deviceID. CommsService is a reference to a communications service from which a device object can obtain a reference to a communications object for use in communicating with the physical device controlled by a device object. DeviceAddress is the network address, obtained from the device table as described above, of the physical device to be controlled by a particular device object. The switch statement selects a particular concrete derived device class for each device ID retrieved from the device table. CreateDeviceList( ) stores references to each device object in the device list with "aDeviceList.add( )." CreateDeviceList( ) returns a reference to the device list with "return aDeviceList."

The class diagram of FIG. 11 includes an exemplary device class (214). The exemplary device class (214) of FIG. 11 includes a deviceID field (472) uniquely identifying the physical device to be administered by the execution of the action. The exemplary device class (214) of FIG. 11 includes an address field (480) identifying a location of a physical device on a data communications network. The exemplary device class (214) of FIG. 11 provides a communications field (478) for a reference to an instance of a communications class that implements a data communications protocol to effect communications between an instance of a device class and a physical device. The device class includes accessor methods (474, 476) for getting and setting attributes of a physical device. An example of a current attribute of a device is an indication that the device is "on" or "off."

The exemplary class diagram of FIG. 11 includes a communications service class (219). The communications service class (219) provides a factory method named createCommsObject(deviceID, networkAddress) (574) that instantiates a communications object that implements a data communications protocol to effect communications between an instance of a device class and a physical device. The createCommsObject( ) method (574) finds a communications class ID in a communications class record in a communication class table having a device ID that matches its call parameter. The createCommsObject( ) method (574) then instantiates a particular concrete derived communications class identified through a switch statement as described above, passing to the constructor the networkAddress from its parameter list, so that the new communications object knows the address on the network to which the new object is to conduct data communications. Each concrete derived communications class is designed to implement data communications according to a particular data communications protocol, Bluetooth, 802.11b, Lonworks, X-10, and so on.

Class diagram of FIG. 11 includes an exemplary communications base class (215). In typical embodiments, at least one concrete communications class is derived from the base class for each data communications protocol to be supported by a particular DML. Each concrete communications class implements a particular data communications protocol for communications device objects and physical devices. Each concrete communications class implements a particular data communications protocol by overriding interface methods (482, 484) to implement actual data communications according to a protocol.

Communications classes allow device classes (214) to operate independently with respect to specific protocols required for communications with various physical devices. For example, one light in a user's home may communicate using the LonWorks protocol, while another light in the user's home may communicate using the X-10 protocol. Both lights can be controlled by device objects of the same device class using communications objects of different communications classes, one implementing LonWorks, the other implementing X-10. Both device objects control the lights through calls to the same communications class interface methods, send( ) (482) and receive( ) (484), neither knowing nor caring that in fact their communications objects use different protocols.

Figure 12:
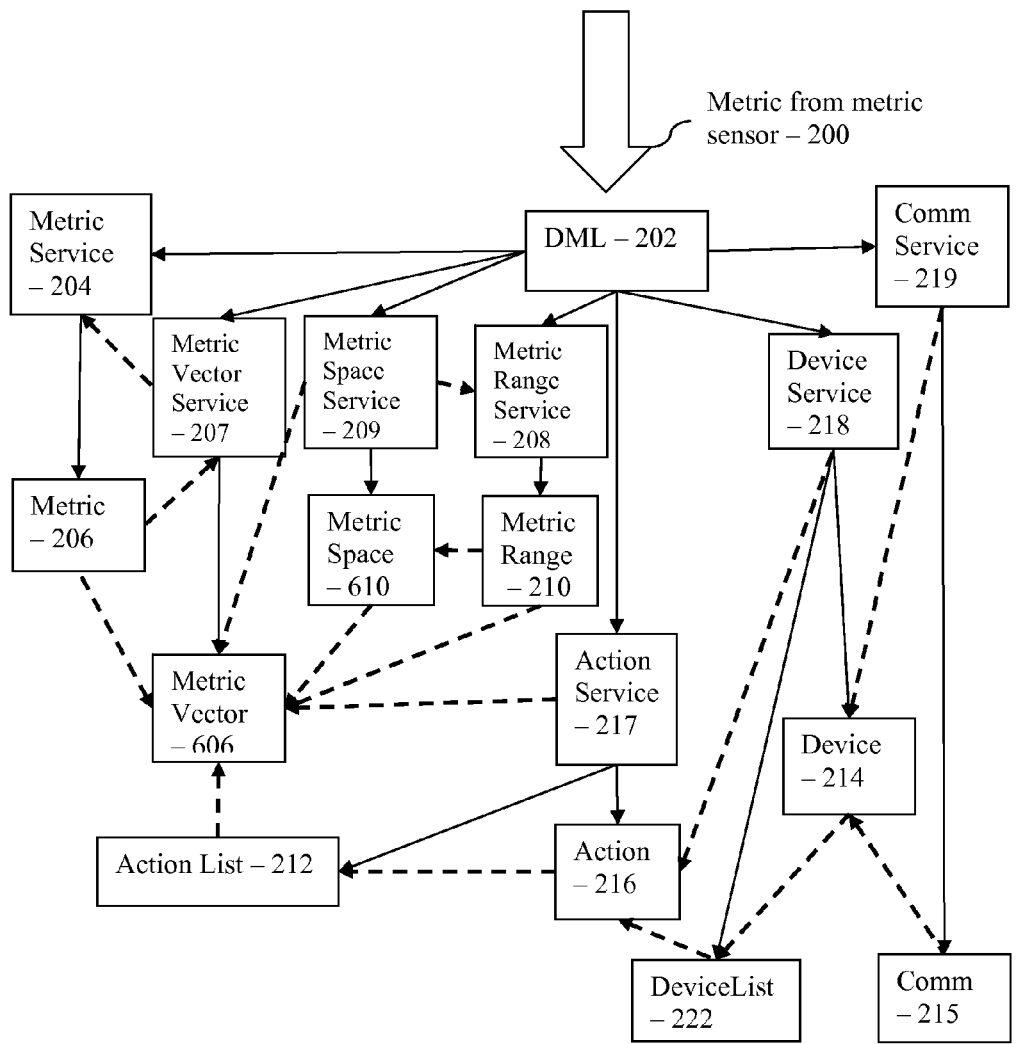
FIG. 12 is a class relationship diagram illustrating the relationship among exemplary data structures useful in implementing methods for administering devices in accordance with the present invention.

FIG. 12 is a class relationship diagram illustrating an exemplary relationship among the exemplary classes of FIG. 11. In the class relationship diagram of FIG. 12, the solid arrows represent instantiation. The solid arrow points from the instantiating class to the instantiated class. In the class relationship diagram of FIG. 12, the dotted arrows represent references. The arrow points from a referenced class to a class whose objects posses references to the referenced class. That is, an object-oriented relation of composition, a "has-a" relationship between classes, is shown by an arrow with a dotted line.

The exemplary class relationship diagram of FIG. 12 includes a DML class (202). A DML object of the DML class (202) instantiates an object of the metric service class (204), an object of the metric vector service class (207), and an object of the metric space service class (209). The DML object also instantiates an object of the metric range service class (208) and an object of the action service class (217). The DML object also instantiates an object of the device service class (218) and an object of the communications service class (219).

When the DML receives a metric (200) from a metric sensor, the DML uses a call such as:

Metric aMetric=MetricService.createMetricObject(userID, metricID, metricValue)

causing the metric service (204) to instantiate an object of the metric class (206). The metric service passes a reference to metric object (206) to metric vector service object (207).

As shown in the class relationship diagram of FIG. 12, a metric vector service (207) instantiates an object of the metric vector class (606). In many typical embodiments the metric vector service class receives a reference to a metric object and using a parameterized factory method, such as createMetricVectorObject( ), instantiates a metric vector object. As shown in the class relationship diagram of FIG. 12, an object of the metric vector class (606) contains a reference to an object of the metric class (206), an object of the metric space service class (209), an object of the metric space class (610), an object of the action service class (217), and an action list (212).

As shown in the class relationship diagram of FIG. 12, a metric space service (209) instantiates an object of the metric space class (610). In many example embodiments, a metric space service uses a parameterized factory method, such as createMetricSpace( ), to instantiate a metric space object. The metric space service passes a reference to the metric space object (610) to the metric vector object. The metric space object (610) contains a reference to a metric range object (210).

As shown in the class relationship diagram of FIG. 12, the metric range service (208) instantiates an object of the metric range class (210). In many examples embodiments of the present invention, as described in more detail above, the metric range service (208) uses a parameterized factory method, such as createRangeObject( ), to instantiate the metric range (210). The metric range service (208) passes to the metric space service (209) a reference to the metric range (210).

As shown in FIG. 12, an action service (217) instantiates an action list of an action list class (212) and objects of action classes (216). The action list (212) is instantiated with references to each of the instantiated actions (216). Each action (216) is instantiated with a reference to the device service (218). In typical examples of methods according to the present invention, the action service (217) uses a parameterized factory method, such as createActionList( ), to instantiate an action list (212) and instantiate actions (216). The action service (217) passes, to the metric vector (606), a reference to the action list (212).

In the example of FIG. 12, the device service (218) instantiates a device list of the device list class (222) and instantiates a device object of the device class (214). The device list (222) is instantiated with a reference to the device object (214). The device object (214) is instantiated with a reference to the communications service (219). In typical examples of methods according to the present invention, the device service (218) uses a parameterized factory method, such as createDeviceList( ), to instantiate a device list (222) and instantiate a device object (216). The device service (218) passes, to the action (216), a reference to the device list (222)

In the example of FIG. 12, the communications service (219) instantiates a communications object of the communications class (215). In typical examples of the methods according to the present invention, the communications service (219) uses a parameterized factory method, such as createCommsObject( ), to instantiate a communications object (215). The communications service (219) passes, to the device object (214), a reference to the communications object (215).

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer implemented method for administering devices, the method comprising:
creating by a computer a user metric vector comprising a plurality of disparate user metrics, wherein each user metric is a measurable aspect of a user's condition, wherein the user is a person;
creating by a computer a first user metric space that is associated with a first environment and specific to the person, the first user metric space comprising a first plurality of metric ranges, wherein each metric range in the first plurality of metric ranges includes a minimum value and a maximum value for each of the plurality of disparate user metrics included in the user metric vector;
creating by a computer a second user metric space that is associated with a second environment and specific to the person, the second user metric space comprising a second plurality of metric ranges, wherein each metric range in the second plurality of metric ranges includes a minimum value and a maximum value for each of the plurality of disparate user metrics included in the user metric vector;
responsive to determining the person is within the first environment,
determining whether the user metric vector is outside the first user metric space;
if the user metric vector is outside the first user metric space, identifying a first action in dependence upon the user metric vector; and
executing the first action;
responsive to determining the person is within the second environment,
determining whether the user metric vector is outside the second user metric space;
if the user metric vector is outside the second user metric space, identifying a second action in dependence upon the user metric vector; and
executing the second action.

2. The method of claim 1 wherein determining whether the user metric vector is outside the first user metric space comprises comparing the metric values of the user metric vector with the first plurality of metric ranges of the first user metric space.

3. The method of claim 2 wherein comparing the metric values of the user metric vector with the first plurality of metric ranges of the first user metric space comprises measuring a degree to which a value of the user metric is outside a metric range.

4. A system for administering devices, the system comprising:
a processor;
an application operable on the processor, the application configured to:
create a user metric vector comprising a plurality of disparate user metrics, wherein each user metric is a measurable aspect of a user's condition, wherein the user is a person;
create a first user metric space that is associated with a first environment and specific to the person, the first user metric space comprising a first plurality of metric ranges, wherein each metric range in the first plurality of metric ranges includes a minimum value and a maximum value for each of the plurality of disparate user metrics included in the user metric vector;
create a second user metric space that is associated with a second environment and specific to the person, the second user metric space comprising a second plurality of metric ranges, wherein each metric range in the second plurality of metric ranges includes a minimum value and a maximum value for each of the plurality of disparate user metrics included in the user metric vector;
responsive to determining the person is within the first environment,
determine whether the user metric vector is outside the first user metric space;
if the user metric vector is outside the first user metric space, identify a first action in dependence upon the user metric vector; and
execute the first action
responsive to determining the person is within the second environment,
determine whether the user metric vector is outside the second user metric space;
if the user metric vector is outside the second user metric space, identify a second action in dependence upon the user metric vector; and
execute the second action.

5. The system of claim 4 wherein the determine of whether the user metric vector is outside the first user metric space comprises a compare of the metric values of the user metric vector with the first plurality of metric ranges of the first user metric space.

6. The system of claim 5 wherein the compare of the metric values of the user metric vector with the first plurality of metric ranges of the first user metric space comprises a measure of a degree to which a value of the user metric is outside a metric range.

7. A computer program product for administering devices, the computer program product comprising:
a computer readable storage device having computer usable program code embodied therewith, the computer usable program code comprising a computer usable program code configured to:
create-creating a user metric vector comprising a plurality of disparate user metrics, wherein each user metric is a measurable aspect of a user's condition, wherein the user is a person;
create a first user metric space that is associated with a first environment and specific to the person, the first user metric space comprising a first plurality of metric ranges, wherein each metric range in the first plurality of metric ranges includes a minimum value and a maximum value for each of the plurality of disparate user metrics included in the user metric vector;
create a second user metric space that is associated with a second environment and specific to the person, the second user metric space comprising a second plurality of metric ranges, wherein each metric range in the second plurality of metric ranges includes a minimum value and a maximum value for each of the plurality of disparate user metrics included in the user metric vector;

responsive to determining the person is within the first environment, determine whether the user metric vector is outside the first user metric space;

if the user metric vector is outside a first user metric space, identify a first action in dependence upon the user metric vector; and execute the first action responsive to determining the person is within the second environment, determine whether the user metric vector is outside the second user metric space:

if the user metric vector is outside the second user metric space, identify a second action in dependence upon the user metric vector; and execute the second action.

8. The computer program product of claim 7 wherein the determine of whether the user metric vector is outside a user metric space comprises a compare of the metric values of the user metric vector with the first plurality of metric ranges of the first user metric space.

9. The computer program product of claim 8 wherein the compare of the metric values of the user metric vector with the first plurality of metric ranges of the first user metric space comprises a measure of a degree to which a value of the user metric is outside a metric range.

10. The method of claim 1, wherein the user metric vector is determined to be outside the first user metric space in response to multiple of the metric values being outside their corresponding metric ranges of the first plurality of metric ranges defined in the first user metric space.

11. The method of claim 10, wherein the user metric vector is determined to be outside the second user metric space in response to multiple of the metric values being outside their corresponding metric ranges of the second plurality of metric ranges defined in the second user metric space.

12. The method of claim 1, wherein the user metric vector is determined to be outside the first user metric space in response to all of the metric values being outside their corresponding metric ranges of the first plurality of metric ranges defined in the first user metric space.

13. The method of claim 12, wherein the user metric vector is determined to be outside the second user metric space in response to all of the metric values being outside their corresponding metric ranges of the second plurality of metric ranges defined in the second user metric space.

14. The method of claim 1, wherein the first action and the second action are equal.

15. The system of claim 4, wherein the user metric vector is determined to be outside the first user metric space in response to multiple of the metric values being outside their corresponding metric ranges of the first plurality of metric ranges defined in the first user metric space.

16. The system of claim 15, wherein the user metric vector is determined to be outside the second user metric space in response to multiple of the metric values being outside their corresponding metric ranges of the second plurality of metric ranges defined in the second user metric space.

17. The system of claim 4, wherein the user metric vector is determined to be outside the first user metric space in response to all of the metric values being outside their corresponding metric ranges of the first plurality of metric ranges defined in the first user metric space.

18. The system of claim 17, wherein the user metric vector is determined to be outside the second user metric space in response to all of the metric values being outside their corresponding metric ranges of the second plurality of metric ranges defined in the second user metric space.

19. The system of claim 4, wherein the first action and the second action are equal.

20. The computer program product of claim 7, wherein the user metric vector is determined to be outside the first user metric space in response to multiple of the metric values being outside their corresponding metric ranges of the first plurality of metric ranges defined in the first user metric space.

21. The computer program product of claim 20, wherein the user metric vector is determined to be outside the second user metric space in response to multiple of the metric values being outside their corresponding metric ranges of the second plurality of metric ranges defined in the second user metric space.

22. The computer program product of claim 7, wherein the user metric vector is determined to be outside the first user metric space in response to all of the metric values being outside their corresponding metric ranges of the first plurality of metric ranges defined in the first user metric space.

23. The computer program product of claim 22, wherein the user metric vector is determined to be outside the second user metric space in response to all of the metric values being outside their corresponding metric ranges of the second plurality of metric ranges defined in the second user metric space.

24. The computer program product of claim 7, wherein the first action and the second action are equal.

* * * * *